(12) United States Patent
Watanabe et al.

(10) Patent No.: US 9,513,003 B2
(45) Date of Patent: Dec. 6, 2016

(54) COMBUSTION APPARATUS, METHOD FOR COMBUSTION CONTROL, BOARD, COMBUSTION CONTROL SYSTEM AND WATER HEATER

(75) Inventors: Akito Watanabe, Fuji (JP); Mituru Sano, Fuji (JP); Toshinobu Muku, Fuji (JP)

(73) Assignee: PURPOSE COMPANY LIMITED, Fuji-Shi (JP)

( * ) Notice: Subject to any disclaimer, the term of this patent is extended or adjusted under 35 U.S.C. 154(b) by 1253 days.

(21) Appl. No.: 12/856,860

(22) Filed: Aug. 16, 2010

(65) Prior Publication Data

US 2012/0037096 A1 Feb. 16, 2012

(51) Int. Cl.
| | |
|---|---|
| *F24H 9/20* | (2006.01) |
| *F23N 5/02* | (2006.01) |
| *F23N 5/26* | (2006.01) |
| *C21D 11/00* | (2006.01) |
| *C21D 9/66* | (2006.01) |
| *F23J 15/00* | (2006.01) |
| *F23L 17/00* | (2006.01) |
| *F23L 17/16* | (2006.01) |
| *F24H 1/00* | (2006.01) |
| *G09B 7/02* | (2006.01) |
| *F23L 11/02* | (2006.01) |
| *F23N 1/02* | (2006.01) |
| *F23N 1/04* | (2006.01) |
| *F23N 5/24* | (2006.01) |
| *F24H 1/40* | (2006.01) |
| *F24H 8/00* | (2006.01) |

(52) U.S. Cl.
CPC ............. *F23L 11/02* (2013.01); *F23N 1/022* (2013.01); *F23N 1/042* (2013.01); *F23N 5/022* (2013.01); *F23N 5/242* (2013.01); *F24H 1/40* (2013.01); *F24H 8/00* (2013.01); *F24H 9/2035* (2013.01); *F23J 2213/30* (2013.01); *F23N 2031/28* (2013.01); *F23N 2041/04* (2013.01); *Y02B 30/102* (2013.01)

(58) Field of Classification Search
None
See application file for complete search history.

(56) References Cited

U.S. PATENT DOCUMENTS

| | | | | | |
|---|---|---|---|---|---|
| 2,440,052 | A | * | 4/1948 | Lingen et al. | 236/9 A |
| 3,172,647 | A | * | 3/1965 | Remmey | 432/47 |
| 3,589,025 | A | * | 6/1971 | Hamerski | 34/468 |
| 3,926,173 | A | * | 12/1975 | Jury | 126/110 R |
| 4,033,320 | A | * | 7/1977 | Jury | 126/110 R |
| 4,131,086 | A | * | 12/1978 | Noguchi et al. | 123/3 |
| 4,294,223 | A | * | 10/1981 | Montague | 126/112 |
| 4,417,528 | A | * | 11/1983 | Vining et al. | 110/229 |

(Continued)

FOREIGN PATENT DOCUMENTS

| | | |
|---|---|---|
| JP | 5-312412 A | 11/1993 |
| JP | 2000-291940 A | 10/2000 |

(Continued)

*Primary Examiner* — Gregory Huson
*Assistant Examiner* — Eric Gorman
(74) *Attorney, Agent, or Firm* — Westerman, Hattori, Daniels & Adrian, LLP

(57) ABSTRACT

A combustion apparatus includes combustion means generating combustion exhaust by combustion of fuel, heat exchange means exchanging heat of the combustion exhaust, and exhaust dilution unit supplying dilution air after the heat exchange by the heat exchange means and diluting the combustion exhaust after the heat exchange, and controls a temperature of the combustion exhaust after the heat exchange below a predetermined temperature by dilution by air supply.

18 Claims, 13 Drawing Sheets

(56) References Cited

U.S. PATENT DOCUMENTS

| | | | |
|---|---|---|---|
| 4,477,019 A * | 10/1984 | Breitbach | F24D 5/00 165/901 |
| 4,479,484 A * | 10/1984 | Davis | 122/18.2 |
| 4,480,985 A * | 11/1984 | Davis | 431/1 |
| 4,488,865 A * | 12/1984 | Davis | 431/1 |
| 4,527,071 A * | 7/1985 | Ausiello | 290/4 R |
| 4,669,656 A * | 6/1987 | Turko | F24H 3/065 126/99 C |
| 4,706,644 A * | 11/1987 | Nakai | 126/101 |
| 4,740,157 A * | 4/1988 | D'Agrosa | 432/14 |
| 4,819,587 A * | 4/1989 | Tsutsui et al. | 122/448.1 |
| 4,836,445 A * | 6/1989 | Okada | 237/2 A |
| 4,906,178 A * | 3/1990 | Goldstein et al. | 431/79 |
| 4,924,848 A * | 5/1990 | Vaughn | F24H 3/087 126/110 AA |
| 4,934,924 A * | 6/1990 | Nakai | 431/41 |
| 4,941,452 A * | 7/1990 | Thrasher et al. | 126/110 R |
| 4,978,291 A * | 12/1990 | Nakai | 431/12 |
| 4,983,362 A * | 1/1991 | Obermuller | 422/173 |
| 5,088,922 A * | 2/1992 | Kakizaki et al. | 432/152 |
| 5,127,345 A * | 7/1992 | Ishikawa et al. | 110/245 |
| 5,154,599 A * | 10/1992 | Wunning | 431/215 |
| 5,183,646 A * | 2/1993 | Anderson et al. | 423/210 |
| 5,201,651 A * | 4/1993 | Niksic et al. | 431/12 |
| 5,222,476 A * | 6/1993 | Chmielewski | 126/110 C |
| 5,249,960 A * | 10/1993 | Monoe | 432/77 |
| 5,317,992 A * | 6/1994 | Joyce | 122/18.31 |
| 5,337,955 A * | 8/1994 | Burd | 236/91 F |
| 5,359,966 A * | 11/1994 | Jensen | 122/17.1 |
| 5,500,388 A * | 3/1996 | Niino et al. | 438/482 |
| 5,562,089 A * | 10/1996 | Astle, Jr. | 126/117 |
| 5,578,132 A * | 11/1996 | Yamaga et al. | 118/724 |
| 5,593,608 A * | 1/1997 | Suzuki | 219/492 |
| 5,616,264 A * | 4/1997 | Nishi et al. | 219/494 |
| 5,666,889 A * | 9/1997 | Evens | F23N 5/003 110/190 |
| 5,676,069 A * | 10/1997 | Hollenbeck | 110/147 |
| 5,791,299 A * | 8/1998 | Matsuo et al. | 122/367.1 |
| 5,848,885 A * | 12/1998 | Tanaka et al. | 431/215 |
| 6,036,482 A * | 3/2000 | Okase | 432/11 |
| 6,059,567 A * | 5/2000 | Bolton et al. | 432/81 |
| 6,065,957 A * | 5/2000 | Kondo et al. | 431/116 |
| 6,089,221 A * | 7/2000 | Mano et al. | 126/116 A |
| 6,113,384 A * | 9/2000 | Sebastiani | F23D 14/74 431/12 |
| 6,159,298 A * | 12/2000 | Saito | 118/715 |
| RE37,128 E * | 4/2001 | Tomlinson | F23L 17/00 126/110 R |
| 6,322,631 B1 * | 11/2001 | Okase | 118/708 |
| 6,352,431 B1 * | 3/2002 | Gatley, Jr. | 432/77 |
| 6,488,076 B1 * | 12/2002 | Yasuda et al. | 165/4 |
| 6,606,968 B2 * | 8/2003 | Iwama et al. | 122/18.1 |
| 7,082,748 B2 * | 8/2006 | Shibata et al. | 60/39.511 |
| 7,251,926 B2 * | 8/2007 | Shibata et al. | 60/39.511 |
| 7,432,475 B2 * | 10/2008 | Nakajima et al. | 219/390 |
| 7,700,156 B2 * | 4/2010 | Aoki et al. | 427/248.1 |
| 2001/0020451 A1 * | 9/2001 | Besik | 122/367.1 |
| 2002/0025688 A1 * | 2/2002 | Kato | 438/758 |
| 2002/0130191 A1 * | 9/2002 | Takagi et al. | 237/12.3 C |
| 2002/0150850 A1 * | 10/2002 | Kim | F23D 14/60 431/2 |
| 2003/0098358 A1 * | 5/2003 | Lyons et al. | 237/55 |
| 2003/0131804 A1 * | 7/2003 | Iwama et al. | 122/18.1 |
| 2004/0226521 A1 * | 11/2004 | Kang et al. | 122/5.51 |
| 2005/0092316 A1 * | 5/2005 | Schonberger | 126/110 R |
| 2005/0121432 A1 * | 6/2005 | Saito et al. | 219/390 |
| 2006/0026974 A1 * | 2/2006 | Takada et al. | 62/150 |
| 2006/0028018 A1 * | 2/2006 | Rolph et al. | 285/148.13 |
| 2006/0115780 A1 * | 6/2006 | Kiyama | F23C 9/08 431/182 |
| 2006/0156980 A1 * | 7/2006 | Won et al. | 118/715 |
| 2006/0258170 A1 * | 11/2006 | Saito et al. | 438/758 |
| 2006/0280670 A1 * | 12/2006 | Teeter et al. | 423/445 R |
| 2007/0117056 A1 * | 5/2007 | Schultz | F23N 1/007 431/19 |
| 2008/0124667 A1 * | 5/2008 | Schultz | F23N 1/022 431/18 |
| 2008/0124668 A1 * | 5/2008 | Schultz | F23N 1/027 431/89 |
| 2008/0182345 A1 * | 7/2008 | Sugishita et al. | 438/7 |
| 2008/0213710 A1 * | 9/2008 | Schultz | F23N 1/027 431/12 |
| 2009/0029486 A1 * | 1/2009 | Ueno et al. | 438/5 |
| 2009/0044794 A1 * | 2/2009 | Hugghins | F23N 3/002 126/116 A |
| 2009/0266278 A1 * | 10/2009 | Wierzchon | 110/346 |
| 2009/0293867 A1 * | 12/2009 | Chian | F23N 3/08 126/99 R |
| 2009/0301406 A1 * | 12/2009 | Ritsema et al. | 122/13.01 |
| 2009/0308372 A1 * | 12/2009 | Nordberg | F23N 3/082 126/116 A |
| 2010/0009302 A1 * | 1/2010 | Nordberg | F23N 1/02 431/12 |
| 2010/0031900 A1 * | 2/2010 | Consadori | F24H 1/08 122/18.1 |
| 2010/0095905 A1 * | 4/2010 | Smelcer | 122/14.2 |
| 2010/0116223 A1 * | 5/2010 | Tsuji et al. | 122/14.3 |
| 2010/0116225 A1 * | 5/2010 | Smelcer | 122/17.1 |
| 2010/0170954 A1 * | 7/2010 | Young et al. | 237/12.3 C |
| 2011/0203788 A1 * | 8/2011 | Kato | 165/292 |
| 2011/0259317 A1 * | 10/2011 | Kameyama et al. | 126/344 |
| 2011/0290228 A1 * | 12/2011 | Tsunekawa et al. | 126/116 A |
| 2012/0090560 A1 * | 4/2012 | Iwama et al. | 122/14.3 |
| 2012/0094483 A1 * | 4/2012 | Komiya | 438/653 |
| 2012/0222631 A1 * | 9/2012 | Lesage et al. | 122/18.5 |
| 2013/0074786 A1 * | 3/2013 | Lesage et al. | 122/17.1 |
| 2013/0230812 A1 * | 9/2013 | Schultz | F23N 5/00 431/12 |
| 2014/0116357 A1 * | 5/2014 | Yano et al. | 122/14.2 |
| 2015/0090200 A1 * | 4/2015 | Qiu | F24H 1/145 122/18.4 |
| 2015/0176862 A1 * | 6/2015 | Kimura | F24H 8/006 122/18.4 |

FOREIGN PATENT DOCUMENTS

| | | |
|---|---|---|
| JP | 2001-241641 A | 9/2001 |
| JP | 2009-121814 A | 6/2009 |

\* cited by examiner

FIG.11

| TEMP. OF HEAT EXCHANGE (HOT WATER TEMPERATURE SENSOR) | 8 °C OR BELOW | | | |
|---|---|---|---|---|
| TEMP. DETECTED BY EXHAUST TEMPERATURE SENSOR (HTH) | 66 °C OR OVER | 66 °C TO 55 °C (HYSTERESIS RANGE) | | 55 °C OR BELOW |
| EXHAUST HI LIMIT (HHL) | ON | OFF | ON | OFF | ON | OFF |
| OPERATION OF COMBUSTION FAN AND EXHAUST DILUTION FAN | ROTATE | STOP | SUCCEED TO PRIOR STATE OF EXHAUST TEMPERATURE SENSOR | STOP | STOP | STOP |

FIG.12

| TEMP. OF HEAT EXCHANGE (HOT WATER TEMPERATURE SENSOR) | OVER 8 °C | | | |
|---|---|---|---|---|
| TEMP. DETECTED BY EXHAUST TEMPERATURE SENSOR (HTH) | 66 °C OR OVER | | 66 °C TO 55 °C (HYSTERESIS RANGE) | 55 °C OR BELOW |
| EXHAUST HI LIMIT (HHL) | ON | OFF | ON | OFF | ON | OFF |
| OPERATION OF COMBUSTION FAN AND EXHAUST DILUTION FAN | ROTATE | ROTATE | ROTATE | SUCCEED TO PRIOR STATE OF EXHAUST TEMPERATURE SENSOR | ROTATE | STOP |

COMBUSTION APPARATUS, METHOD FOR COMBUSTION CONTROL, BOARD, COMBUSTION CONTROL SYSTEM AND WATER HEATER

BACKGROUND OF THE INVENTION

1. Field of the Invention

The present invention relates to exhaust control of a combustion apparatus such as a heat pump recovering latent heat from combustion exhaust and, for example, relates to a combustion apparatus, a method for combustion control, a combustion control board, a combustion control system and a water heater that control a temperature of exhaust gas to be a predetermined temperature or below.

2. Description of the Related Art

Higher efficiency of heat exchange of combustion exhaust can be achieved if sensible heat of the combustion exhaust of high temperatures is exchanged (primary heat exchange) and latent heat of the combustion exhaust after the primary heat exchange is exchanged (secondary heat exchange). However, water vapor in the air is condensed around a secondary heat exchanger by its heat exchange of the latent heat of the combustion exhaust after the primary heat exchange, and thus drains are generated.

It is known concerning the above heat exchange of combustion gas that when drains are generated around a heat exchanger, combustion gas is diluted by supplying air to the periphery of the heat exchanger and when drains are not generated, air feeding pipes are cooled and thus, the occurrence of drains and white smoke in an exhaust path etc. is prevented (for example, Japanese Laid-open Patent Publication No. 05-312412).

It is known concerning reduction of white smoke that NOx is reduced by an induction fan, provided for a dilution air hole and introducing dilution air from the dilution air hole, provided for an exhaust gas flow path, to the exhaust gas flow path, and discharging white smoke is prevented by diluting and lowering the temperature of exhaust gas with saturated water vapor (for example, Japanese Laid-open Patent Publication No. 2000-291940.)

It is also known that if a plurality of latent heat recovery type heat pumps are provided, combustion exhaust gases from an individual passage of each of the latent heat recovery type heat pump are mixed to reduce white smoke (for example, Japanese Laid-open Patent Publication No. 2001-241641.)

It is known concerning exhaust control of combustion equipment that combustion capacity is controlled in response to an exhaust temperature to lower the exhaust temperature (for example, Japanese Laid-open Patent Publication No. 2009-121814.)

In the art of supplying air from air feeding pipes to dilute combustion gas around a heat exchanger, the air is blown to the heat exchanger installed downstream of exhaust. There occurs the inconvenience that the air cools water feeding pipes of the heat exchanger to decrease heat efficiency.

In the art of introducing dilution air to an exhaust gas flow path to dilute exhaust gas, pressure fluctuation occurs at the downstream of combustion means if combustion conditions vary and exhaust gas emissions vary. Pressure suppression is needed since the supply of mixture gas by an induction fan for combustion or an air ratio varies.

When the occurrence of white smoke is suppressed by mixing dilution air with combustion exhaust gas, a fan for dilution is installed outside equipment after the equipment is installed. In this case, some technique to install the fan is needed and thus, it is difficult to apply the art to equipment for an extended exhaust pipe.

The art of controlling exhaust temperatures by controlling combustion capacity in response to the exhaust temperatures is for in-room installation, and not suitable for outdoor installation.

SUMMARY OF THE INVENTION

A first object of the present invention is to achieve lower temperatures of combustion exhaust after heat exchange without decreasing heat efficiency of the heat exchange.

A second object of the present invention is to select materials used for an exhaust path more freely by lowering an exhaust temperature.

A third object of the present invention is to achieve minimizing an apparatus, that is, a compact apparatus by diluting combustion exhaust.

To achieve the above objects, a combustion apparatus of the present invention includes combustion means generating combustion exhaust by combustion of fuel; heat exchange means exchanging heat of the combustion exhaust; and exhaust dilution unit supplying dilution air after the heat exchange by the heat exchange means and diluting the combustion exhaust after the heat exchange.

To achieve the above objects, a method for combustion control of the present invention includes generating combustion exhaust by combustion of fuel; exchanging heat of the combustion exhaust; and supplying dilution air after the heat exchange of the combustion exhaust and diluting the combustion exhaust after the heat exchange.

To achieve the above objects, a combustion control board of the present invention includes a control unit taking a detected temperature of combustion exhaust, generating an output of stopping combustion if the detected temperature is equal to or over an upper temperature limit, and generating a control output permitting the combustion if the detected temperature reaches a lower temperature limit.

To achieve the above objects, a combustion control system of the present invention includes combustion means generating combustion exhaust by combustion of fuel; heat exchange means exchanging heat of the combustion exhaust; exhaust dilution unit supplying dilution air after the heat exchange by the heat exchange means and diluting the combustion exhaust after the heat exchange; and control means stopping combustion by the combustion means if the temperature of the combustion exhaust is equal to or over an upper temperature limit, and permitting the combustion if the temperature of the combustion exhaust is equal to or below a lower temperature limit.

To achieve the above objects, a water heater of the present invention includes combustion means generating combustion exhaust by combustion of fuel; heat exchange means exchanging heat of the combustion exhaust for water; and exhaust dilution unit supplying dilution air after the heat exchange by the heat exchange means and diluting the combustion exhaust after the heat exchange.

Any of the following effects can be obtained from the above described combustion apparatus, method for combustion control, combustion control board, combustion control system or water heater of the present invention.

(1) Excess air does not flow in a heat exchanger since combustion gas is diluted in a place following a place of exchanging heat. Thereby, heat efficiency is not decreased.

(2) Dilution fan control and combustion control are executed as well as exhaust temperature control can be executed, by monitoring exhaust temperatures any time.

Even if a contrary wind occurs, a backflow preventer works and an exhaust obstruction occurs, it is possible to find the change of exhaust temperatures and stop combustion.

(3) Diluting and cooling exhaust brings more choice of materials for exhaust paths. For example, a resin damper can be manufactured.

(4) Minimizing an apparatus, that is, a compact apparatus can be achieved even if dilution means is provided.

BRIEF DESCRIPTION OF DRAWINGS

FIG. 11 depicts an example of a control form of a combustion fan and an exhaust dilution fan according to other embodiments;

FIG. 12 depicts an example of a control form of the combustion fan and the exhaust dilution fan according to the other embodiments.

DETAILED DESCRIPTION OF THE PREFERRED EMBODIMENTS

First Embodiment

Figure 1:
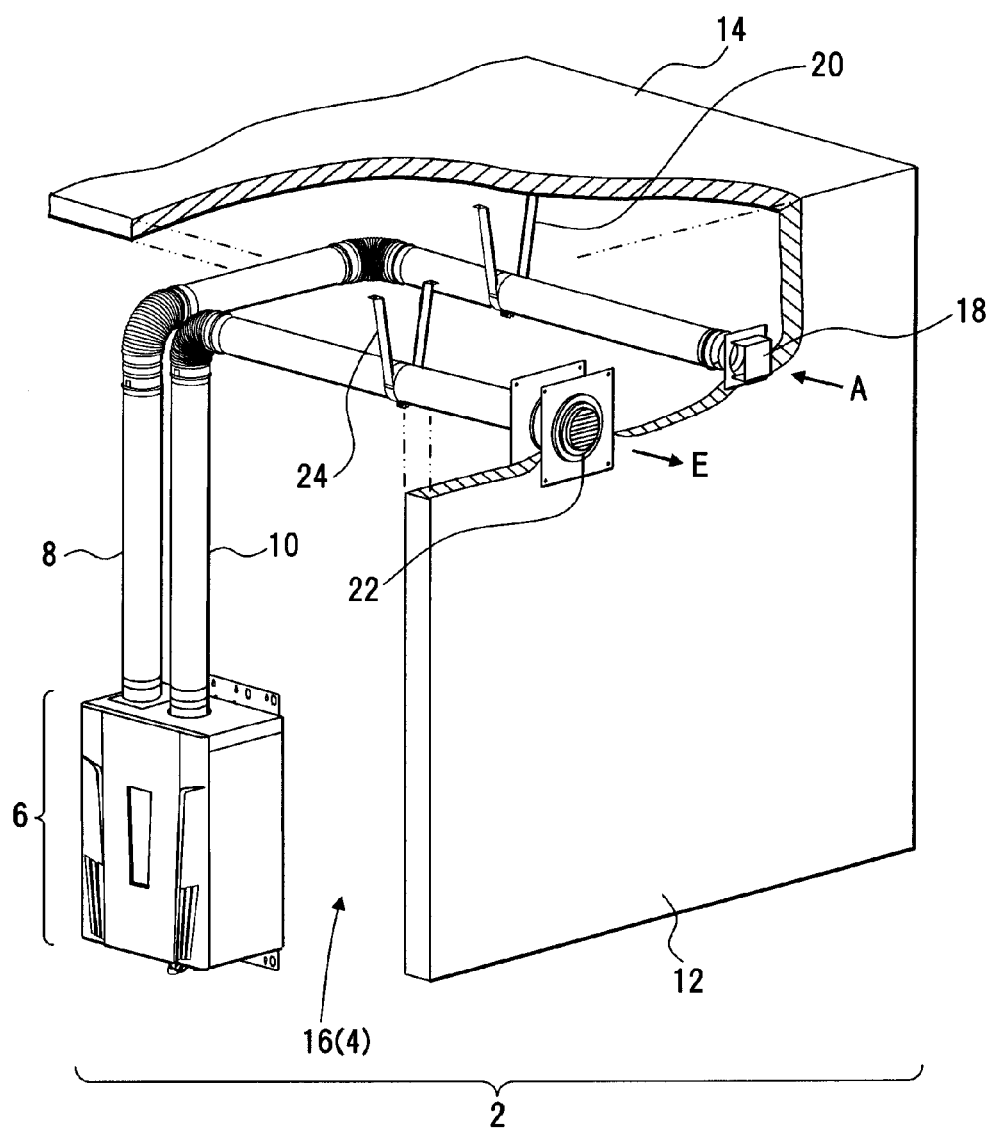
FIG. 1 depicts an example of a water heating system according to a first embodiment.

A first embodiment discloses a water heating system. The first embodiment will be described with reference to FIG. 1. FIG. 1 depicts an example of a water heating system.

A water heating system 2 is an example of a combustion apparatus, a method for combustion control, a combustion control board, a combustion control system or a water heater of the present invention. The water heating system 2 is installed in a room 4, and, as depicted in FIG. 1, provides a water heater 6, an air supply path 8 and an exhaust path 10.

The water heating system 2 is an example of a combustion system combusting fuel gas G. The water heating system 2 is a system for exchanging heat of combustion exhaust for water to supply the heated water.

The room 4 is an example of a room separated from a living space, and may be a space closed to the outside air such as a garage. A wall 12 and a ceiling 14 are separation means separating the water heating system 2 from the outside air. 16 is an indoor space.

The water heater 6 is an example of a combustion apparatus combusting the fuel gas G, and has a function of exchanging heat of combustion exhaust for water to supply the heated water. The water heater 6 may be a latent heat recovery type water heater. The water heater 6 may provide a latent heat recovery type heat pump, and may provide a plurality of latent heat recovery type heat pumps for a hybrid product such as a water heater with space heating capability and a bath water heater.

The air supply path 8 is an example of air supply means for the water heater 6, and installed between an air supply part (for example, a sidewall vent) 18 placed in the wall 12 and the water heater 6. A stay rod 20 is provided for the air supply path 8 at its middle. In the embodiment, the stay rod 20 fixes the air supply path 8 to the ceiling 14.

The exhaust path 10 is an example of exhaust means from the water heater 6, and is installed between an exhaust part (terminator) 22 placed in the wall 12 and the water heater 6. A stay rod 24 is provided for the exhaust path 10 at its middle. In the embodiment, the stay rod 24 fixes the exhaust path 10 to the ceiling 14.

The air supply part 18 and the exhaust part 22 are placed separately from each other to prevent combustion exhaust from being supplied into the air supply part 18.

In the water heating system 2 like the above, air is taken from the outside into the air supply part 18, the taken air is introduced to the water heater 6 through the air supply path 8, and thus combustion of the fuel gas G is supported. Combustion exhaust generated in the water heater 6 is introduced from the exhaust path 10 to the exhaust part 22 to be vented outside the room.

Second Embodiment

Figure 2:
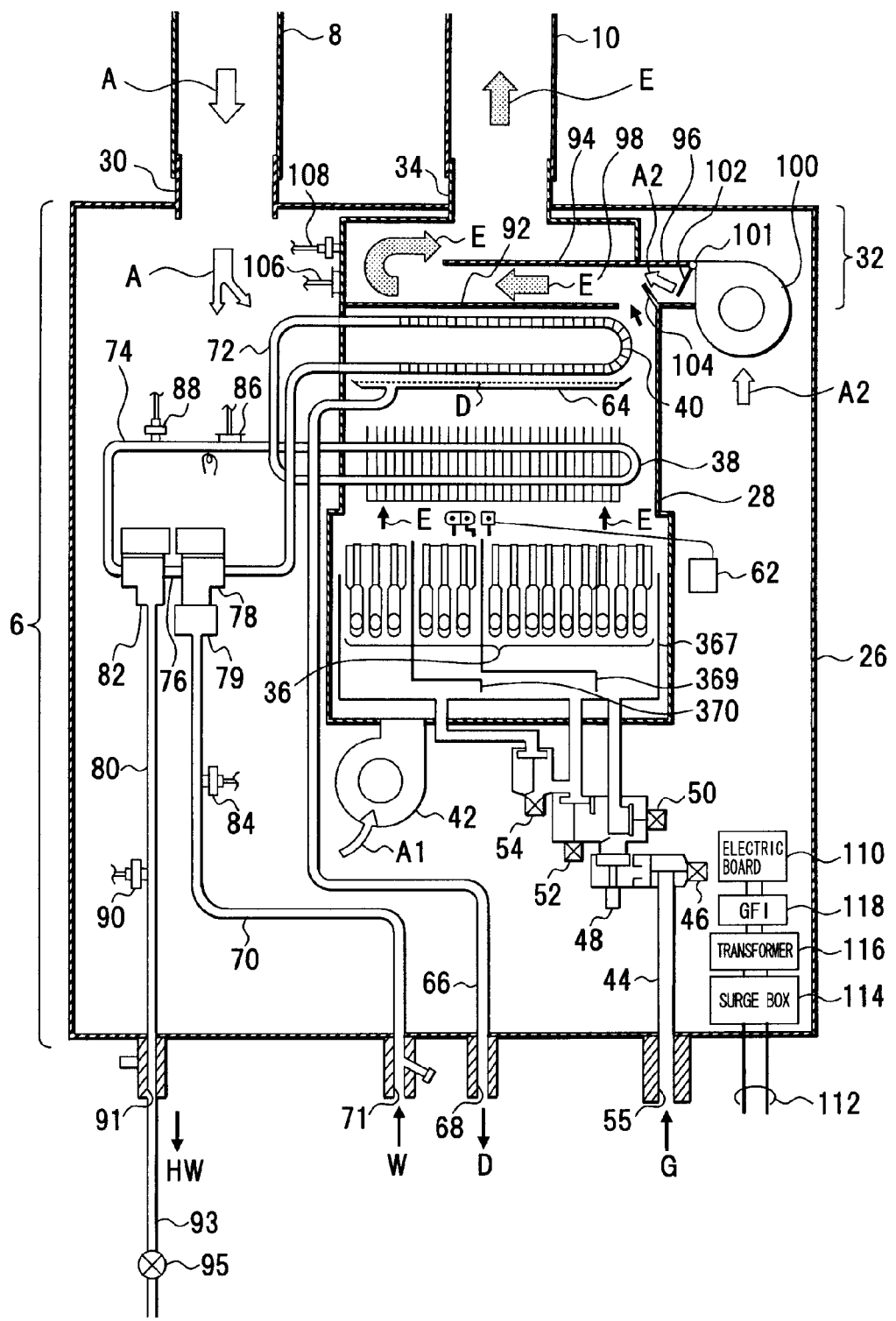
FIG. 2 depicts an example of a water heater according to a second embodiment.
Figure 3:
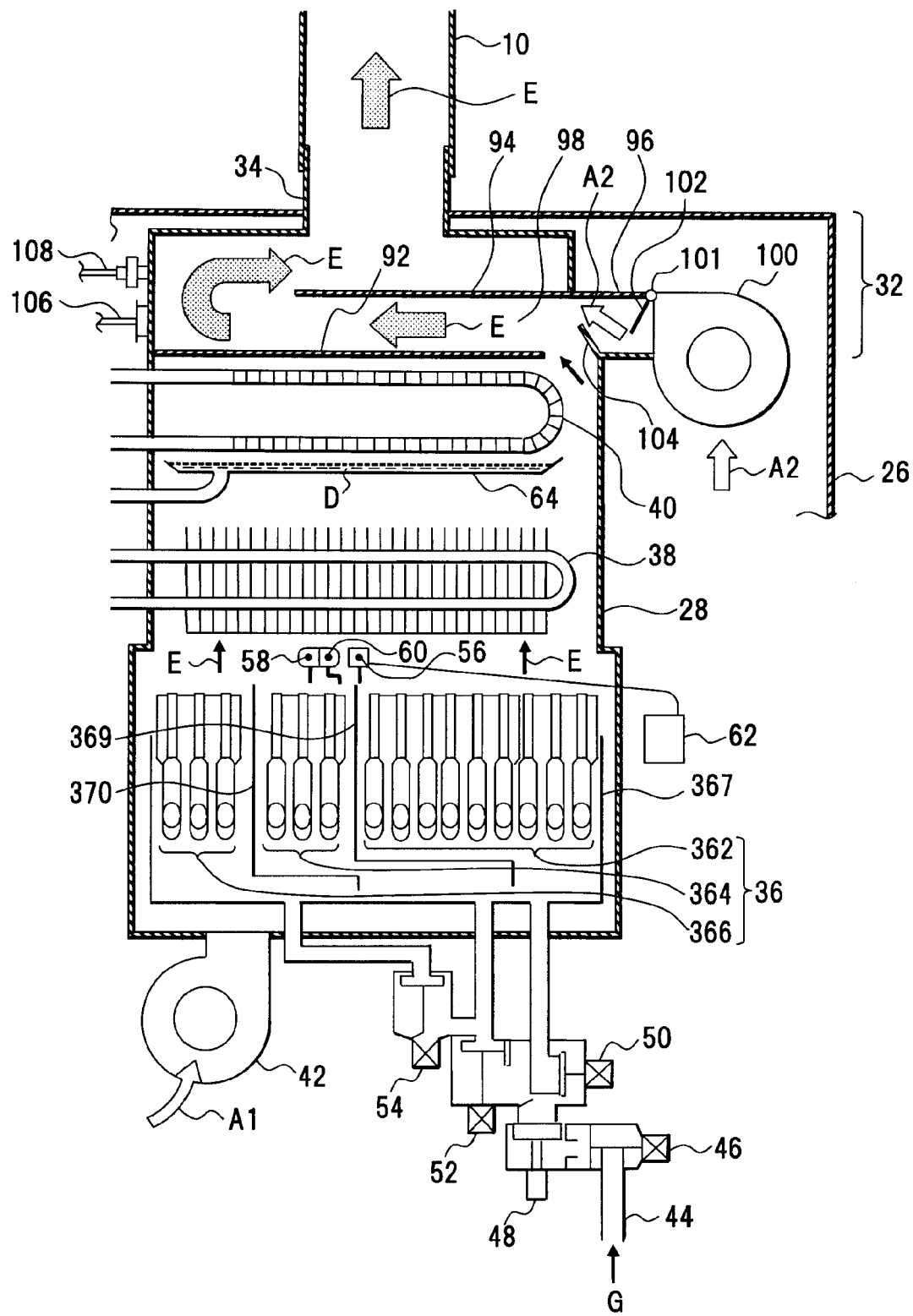
FIG. 3 is an enlarged view of a combustion chamber.

A second embodiment discloses the above described water heater 6. The second embodiment will be described with reference to FIGS. 2 and 3. FIG. 2 depicts an example of a water heater and FIG. 3 depicts an enlarged combustion chamber of the water heater.

The water heater 6 is an example of a combustion apparatus of the present invention. The water heater 6 exchanges heat of combustion exhaust for water W to supply hot water HW. A housing 26 is provided for the water heater 6. A combustion chamber 28 is placed in the housing 26. The housing 26 is a sealed space. An air supply tube 30 is formed on the housing 26 for supplying air into the sealed space. The above described air supply path 8 is connected to the air supply tube 30, and air supply A is executed via the air supply tube 30 and the air supply path 8.

The combustion chamber 28 is a combustion space. An exhaust dilution unit 32 is provided for the combustion chamber 28 on its top. An exhaust tube 34 is formed on the exhaust dilution unit 32. The exhaust tube 34 is separated from the sealed space of the housing 26. The above described exhaust path 10 is connected to the exhaust tube 34, and exhaust E is vented via the exhaust tube 34 and the combustion exhaust path 10. A burner 36, a primary heat exchanger 38 and a secondary heat exchanger 40 are placed in the combustion chamber 28.

The burner 36 is an example of combustion means combusting fuel gas G, and provides a first burner unit 362, a second burner unit 364 and a third burner unit 366. A guide 367 surrounding these burner units 362, 364 and 366 is placed. Also, a partition 369 between the burner unit 362 and the burner unit 364, and a partition 370 between the burner unit 364 and the burner unit 366 respectively partition a space for the burner units into an individual space.

A combustion fan 42 is placed below the burner units 362, 364 and 366. Combustion air A1 is supplied to the combustion fan 42 from the air A supplied into the housing 26. A main valve 46, a proportional valve 48 and changeover valves 50, 52 and 54 are placed in a gas supply pipe 44 that supplies the fuel gas G to the burner 36 as means supplying and adjusting the supply of the fuel gas G, or closing the supply thereof. The main valve 46 is placed most upstream of the gas supply pipe 44, and is a changeover valve for supplying or closing the supply of the fuel gas G. The proportional valve 48 adjusts the supply of the fuel gas G of flowing in the gas supply pipe 44. The changeover valves 50, 52 and 54 correspond to the burner units 362, 364 and 366, respectively, and are switching means for selecting a burner unit for combustion from the burner units 362, 364 and 366. A gas supply source is connected to a gas supply inlet 55 of the gas supply pipe 44, and the fuel gas G is supplied therefrom.

A spark plug 56, a flame detection rod 58 and a self-check flame rod 60 are provided for a combustion outlet of the burner 36. An igniter 62 placed outside the combustion chamber 28 is connected to the spark plug 56.

The primary heat exchanger 38 is an example of a first heat exchange means, is placed upstream of combustion exhaust E generated by the combustion of the burner 36, and mainly exchanges sensible heat from the combustion exhaust E for the water W.

The secondary heat exchanger 40 is an example of a second heat exchange means, is placed more downstream than the primary heat exchanger 38, and mainly exchanges latent heat from the combustion exhaust E after the primary heat exchange for the water W. A drain vessel 64 is placed below the secondary heat exchanger 40. The drain vessel 64 receives drain (waste field) D generated in the secondary heat exchanger 40 by secondary heat exchange. A drainpipe 66 is connected to the drain vessel 64. The drain D received by the drain vessel 64 is introduced through the drainpipe 66 to a drain outlet 68 of the housing 26 to be discharged.

A water supply path 70 is connected to the secondary heat exchanger 40, and the water W is supplied to the secondary heat exchanger 40 prior to the primary heat exchanger 38. A tap water path is connected to a water supply inlet 71 of the water supply path 70, and the water W such as tap water is supplied therefrom. The inlet of the primary heat exchanger 38 is linked to the outlet of the secondary heat exchanger 40 by a joint path 72, and the hot water HW obtained by the secondary heat exchange flows into the primary heat exchanger 38 via the joint path 72. A hot water path 74 is connected to the outlet of the primary heat exchanger 38, and the hot water HW heated by the primary heat exchange flows into the hot water path 74. A bypath circuit 76 across the primary heat exchanger 38 is provided between the water supply path 70 and the hot water path 74. The bypath circuit 76 is means for running the water W into the hot water HW. A bypath valve 78 is placed at the inlet of the bypath circuit 76 (water supply path 70 side). The flow rate of the water W supplied to the hot water HW via the bypath circuit 76 is determined according to the opening of the bypath valve 78. A flow rate sensor 79 is placed in the water supply path 70 for detecting the flow rate. A water control valve 82 is placed between the hot water path 74 and a hot water supply path 80. The flow rate of the outgoing hot water HW is controlled according to the opening of the water control valve 82 and thus, the supply of the water W is controlled.

A temperature sensor 84 is placed at the water supply path 70, and detects the temperature of supplied water. A heat exchange Hi limit 86 and a hot water temperature sensor 88 are placed at the outlet of the primary heat exchanger 38, and the temperature of the hot water HW is detected. A mixture temperature sensor 90 is placed at the hot water supply path 80, and detects the temperature of the mixture of the hot water HW and the water W. The heat exchange Hi limit 86 is the same structure as an exhaust Hi limit 106 (FIG. 6) described below.

A hot water supply pipe 93 supplying hot water to a demanded place such as a house's interior is connected to a hot water outlet 91 of the hot water supply path 80, and a hot water faucet 95 is provided thereto. The hot water faucet 95 may be a shower valve.

The exhaust dilution unit 32 is formed on the top of the combustion chamber 28, is an exhaust path bent by a first path wall 92 and a second path wall 94, and provides an exhaust dilution duct 96 on the top of the combustion chamber 28. The exhaust dilution duct 96 communicates with a path 98 surrounded by the path walls 92 and 94. An exhaust dilution fan 100 is placed at the exhaust dilution duct 96, and air supply A2 from the housing 26 is taken into the path 98 through the exhaust dilution duct 96 by the exhaust dilution fan 100. The air supply A2 is mixed with the combustion exhaust E, and the combustion exhaust E is diluted by the air supply A2. The combustion exhaust E after the dilution flows into the exhaust path 10 from the exhaust tube 34. A backflow preventer 102 and a partition 104 are placed in the exhaust dilution duct 96 as air flow guides. The backflow preventer 102 is an example of backflow preventing means that prevents the combustion exhaust E from flowing back to the exhaust dilution fan 100. The partition 104 prevents the air supply A2 from intruding into the secondary heat exchanger 40.

The exhaust Hi limit 106 (FIG. 6) and an exhaust temperature sensor 108 are placed at the exhaust dilution unit 32. The exhaust Hi limit 106 is an example of a temperature detection switch. The exhaust Hi limit 106 monitors the temperature of the combustion exhaust E and if 69 (° C.) is detected as a predetermined temperature, the exhaust Hi limit 106 becomes non-conducts. The exhaust temperature sensor 108 is an example of a temperature sensor detecting an exhaust temperature.

An electric board 110 is placed in the housing 26. The electric board 110 is electric control means for the water heater 6 and is an example of a combustion control board. An electrical supply line 112 is connected to the electric board 110, and an AC source is inputted via a surge box 114, a transformer 116 and GFI 118. The surge box 114 is means for absorbing a surge from an AC source and the transformer 116 transforms an AC source to a predetermined voltage.

As to the water heater 6, described will be (a) a start of water heating and combustion operation, (b) heat exchange operation, (c) exhaust dilution operation of the exhaust dilution unit 32, (d) air supply and exhaust operation, (e) hot water outgoing temperature control, (f) combustion control of the burner 36 and (g) drain discharge operation.

(a) Start of Water Heating and Combustion Operation

In the water heater 6, when the hot water supply faucet 95 of a shower etc. connected to the hot water supply path 80 is opened, the water W flows into the water supply path 70. In the water supply path 70, the temperature of supplied water is detected by the temperature sensor 84 and the flow rate of supplied water is detected by the water rate sensor 79. The detected information is inputted to the electric board 110. The main valve 46 is opened, the changeover valve 50, 52 or 54 is opened, and the burner 36 is ignited by the operation of the igniter 62 and the spark plug 56. At that time, the combustion fan 42 starts working, and combustion air (the air supply A1) is supplied to the burner 36 from the air supply A supplied from the air supply tube 36 to the housing 26. The fuel gas G mixed with the air supply A1 is combusted in the burner 36. This combustion generates the combustion exhaust E of high temperatures in the combustion chamber 28.

(b) Heat Exchange Operation

The combustion exhaust E flows into the primary heat exchanger 38 at a downstream side assuming that the burner 36 in the combustion chamber 28 is upstream. In the primary heat exchanger 38, sensible heat is mainly absorbed from the combustion exhaust E to be exchanged for the water W (primary heat exchange). The combustion exhaust E after the primary heat exchange flows into the secondary heat exchanger 40. In the secondary heat exchanger 40, latent heat is mainly absorbed from the combustion exhaust E after the primary heat exchange to be exchanged for the water W (secondary heat exchange). Like the above, the combustion exhaust E after the primary heat exchange and the secondary heat exchange is cooled with its sensible heat and latent heat being absorbed, diluted by being mixed with the air supply A2 by the exhaust dilution unit 32 to be further cooled, and then vented to the outside through the exhaust tube 34 and the exhaust path 10.

(c) Exhaust Dilution Operation of Exhaust Dilution Unit 32

The exhaust dilution fan 100 starts rotating at the same time when the burner 36 starts combusting, and the backflow preventer 102 at the exhaust dilution duct 96 is opened. If the exhaust dilution fan 100 rotates, the air A2 is sent from the housing 26 to the exhaust dilution duct 96, and the air A2 is supplied from the exhaust dilution duct 96 to the exhaust dilution unit 32. The air A2 joins the combustion exhaust E after the secondary heat exchange, the combustion exhaust E is diluted by the air supply A2, and thus the combustion exhaust E after the secondary heat exchange is further cooled.

The temperature of the combustion exhaust E in the exhaust dilution unit 32 is monitored by the exhaust Hi limit 106 and the exhaust temperature sensor 108. When the exhaust temperature exceeds a setting temperature of the exhaust Hi limit 106, for example, 69 (° C.), the exhaust Hi limit 106 becomes non-conducts. Thereby, the temperature of the combustion exhaust E is lowered by the control of the combustion of the burner 36 etc.

(d) Air Supply and Exhaust Operation

Air is supplied from the outside to the water heater 6 via the air supply pipe 8, and the combustion exhaust E is vented to the outside via the exhaust path 10. The rotation of the exhaust dilution fan 100 is associated with that of the combustion fan 42. If the rotation speed of the combustion fan 42 is reduced, the rotation speed of the exhaust dilution fan 100 is reduced. On the contrary, if the rotation speed of the combustion fan 42 is increased, the rotation speed of the exhaust dilution fan 100 is also increased. As the above, the rotation of the exhaust dilution fan 100 and combustion fan 42 may be associated and may be independent.

(e) Hot Water Outgoing Temperature Control

The water W flows into the secondary heat exchanger 40. After heat exchange is executed with latent heat of the combustion exhaust E at the downstream side (secondary heat exchange), the water W flows into the primary heat exchanger 38, and then heat exchange is executed with sensible heat of the combustion exhaust E at the upstream side (primary heat exchange). The temperature of the hot water HW in the outlet of the primary heat exchanger 38 is detected by the hot water temperature sensor 88 at the outlet of the primary heat exchanger 38. When the detected temperature is higher than a target temperature, the bypath valve 78 is opened, the water W flows into the bypath circuit 76 to be mixed with the hot water HW, and the temperature of the hot water HW is controlled to be the target temperature. The temperature of the hot water HW is detected by the mixture temperature sensor 90 at the hot water supply path 80. The hot water HW is supplied to the above described shower etc.

The temperatures detected by the mixture temperature sensor 90 are inputted to the electric board 110 continuously, and is used for the opening control of the water control valve 82 as control information. As a result, the flow rate is controlled to be a flow rate necessary to reach the target temperature by the opening of the water control valve 82. Based on the flow rate, the hot water HW is supplied from the hot water supply path 80.

(f) Combustion Control of Burner 36

In the burner 36, the burner units 362, 364 and 366 in the burner 36 are switched by the opening and closing of the changeover valves 50, 52 and 54 on the condition that the main valve 46 at the gas supply pipe 44 is open, and the supply of the fuel gas G is adjusted according to the opening of the proportional valve 48 to control the combustion of the fuel gas G.

(g) Drain Discharge Operation

In the secondary heat exchanger 40 recovering latent heat of the combustion exhaust E, water vapor in the combustion exhaust E is condensed by heat exchange, and the drain D is generated. The drain D includes impurities in the combustion exhaust E. The drain D is pooled in the drain vessel 64 placed below the secondary heat exchanger 40, introduced from the drain 66 to the drain outlet 68, and discharged to the outside of the water heater 6.

Figure 4:
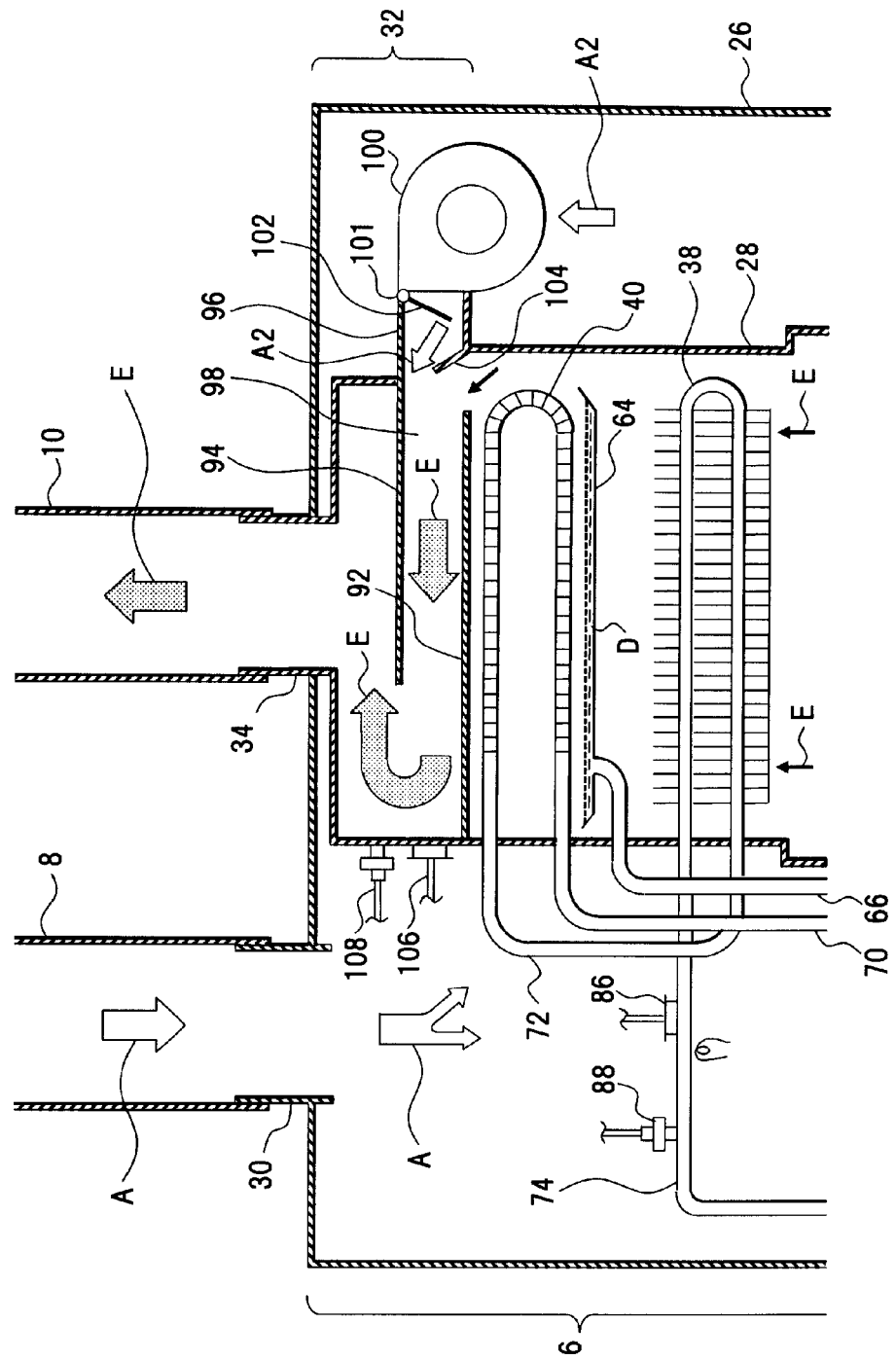
FIG. 4 is an enlarged view of an air supply tube and an exhaust dilution unit.
Figure 5A:
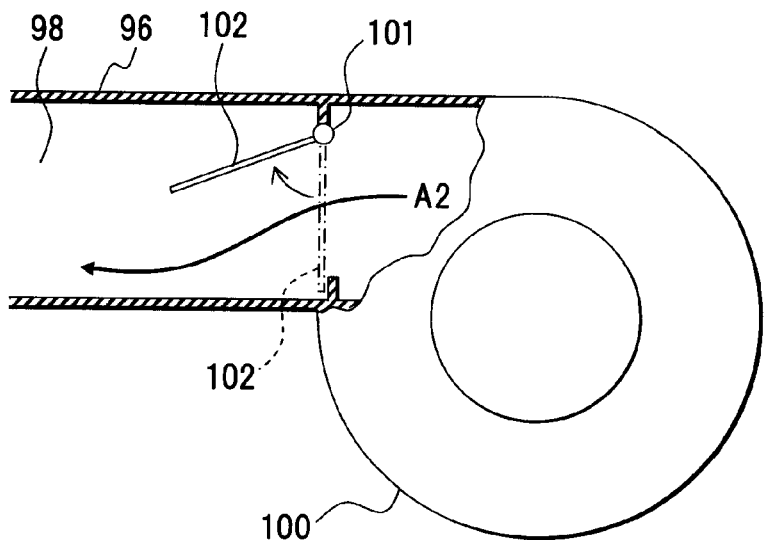
FIGS. 5A to 5B depict an example of structure of a backflow preventer and operation thereof.
Figure 5B:
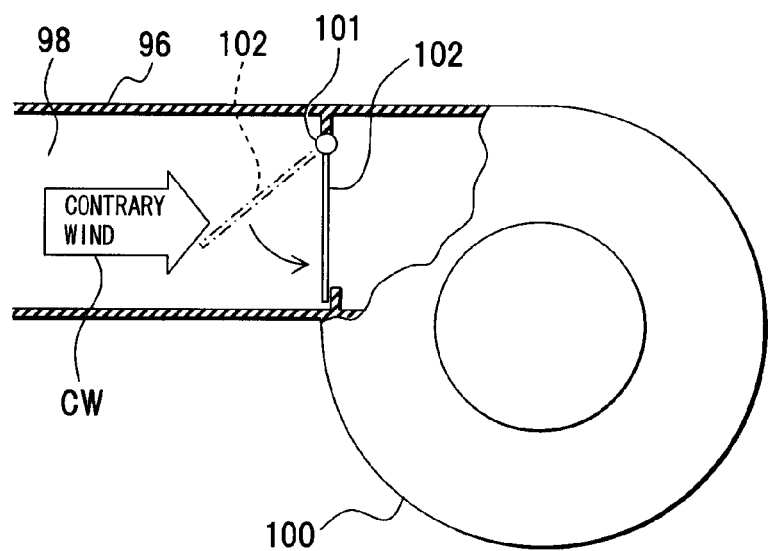
Figure 6A:
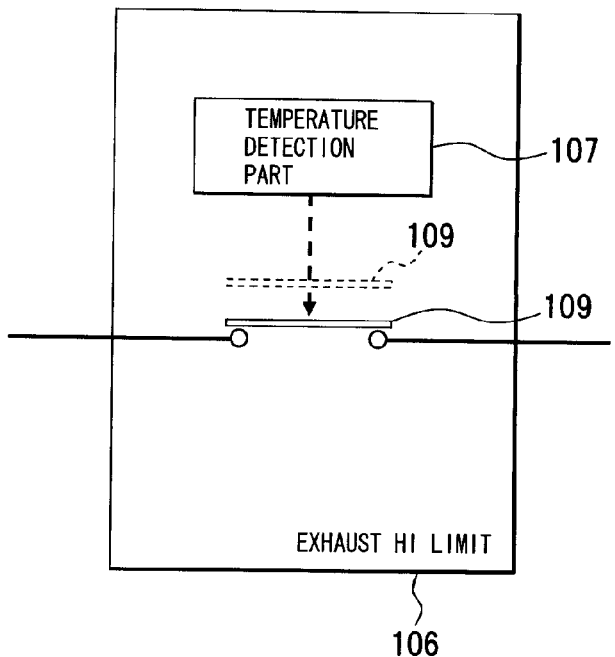
FIGS. 6A to 6B depict an example of structure of an exhaust Hi limit and operation thereof.
Figure 6B:
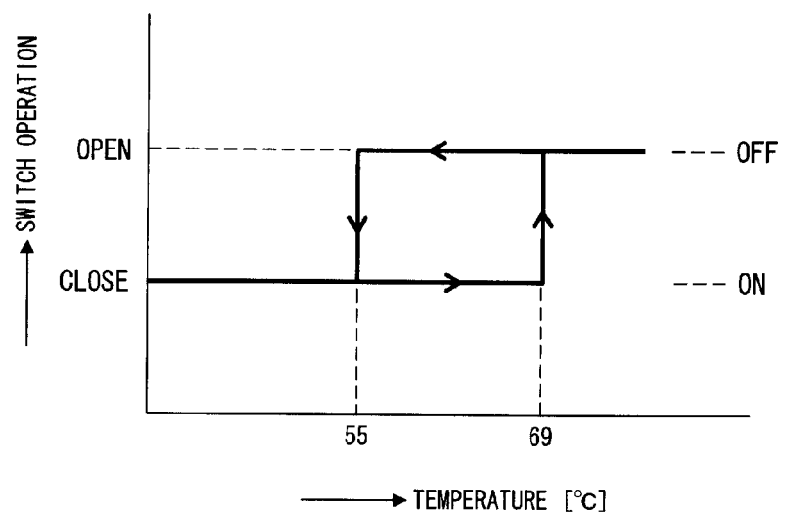

The exhaust dilution unit 32 will be described with reference to FIGS. 4 to 6B. FIG. 4 depicts the mixture of combustion exhaust and dilution air in the exhaust dilution part, FIGS. 5A to 5B depict a function of the backflow preventer, and FIGS. 6A to 6B depict the structure of the exhaust Hi limit and operation thereof. In FIGS. 4 to 6B, the same components as those in FIGS. 2 to 3 are denoted by the same reference numerals.

The exhaust dilution unit 32 is means for mixing the air A2 with the combustion exhaust E after heat exchange, diluting the combustion exhaust E by the air A2, and lowering the temperature of the combustion exhaust E further than that after the heat exchange.

The combustion exhaust E, whose sensible heat is absorbed by the heat exchange in the primary heat exchanger 38 and whose latent heat is absorbed by the heat exchange in the secondary heat exchanger 40, lowers its temperature to 80 (° C.) (176 (° F.)) or so. However, although the exhaust pipe 10 can stand the heat of the temperature if a metal tube is used therefore, if a resin tube is used for the exhaust pipe 10, it is needed to lower the temperature of the combustion exhaust E below heat proof temperature of the resin. Thus, it is needed that the temperature of the combustion exhaust E passing through the exhaust dilution unit 32 is lowered below 69 (° C.) (156 (° F.)). In the CSA (Canadian Standard Association) standard, it is required that the temperature of the combustion exhaust E of the maximum combustion is 69 (° C.) (156 (° F.)) or below (° C.=(° F.−32)×5/9).

The exhaust dilution unit 32 is placed in order to apply to such standard. The exhaust dilution unit 32 is a function unit taking the air A2 of the room temperature thereinto by rotating the exhaust dilution fan 100, diluting the combustion exhaust E by mixing the air A2 with the combustion exhaust E, and cooling combustion exhaust E to equate or lower the temperature of the combustion exhaust E flowing in the exhaust tube 34 to or below the standard temperature.

In the embodiment, as depicted in FIG. 4, the exhaust dilution unit 32 is placed downstream of the combustion chamber 28. The exhaust dilution duct 96 is provided for the exhaust dilution unit 32. The exhaust dilution fan 100 is provided for the exhaust dilution duct 96 to take the air A2. The air A2 is efficiently mixed with the combustion exhaust E after the secondary heat exchange by providing the backflow preventer 102 and the partition 104. Describing the mixture of the air A2 with the combustion exhaust E in detail, the exhaust dilution fan 100 rotates, the air A2 is taken from the inside space of the housing 26 into the exhaust dilution duct 96, the backflow preventer 102 is opened, and the partition 104 guides an air flow. As a result, the combustion exhaust E passing through the secondary heat exchanger 40 is taken into the air supply A2 guided by the partition 104 to be joined, and the air A2 is mixed with the combustion exhaust E.

The partition 104 guides the air A2 to introduce the air A2 to the path wall 92 and thus, the air A2 joins the combustion exhaust E reaching the path 92 without preventing the combustion exhaust E at the secondary heat exchanger 40 from rising. Such an air flow guiding function of the partition 104 efficiently mixes the combustion exhaust E and the air A2, and prevents the air A2 from flowing into the secondary heat exchanger 40. Thus, the secondary heat exchanger 40 does not touch the air A2, and the decrease of the efficiency of the heat exchange of the secondary heat exchanger 40 can be prevented.

The backflow preventer 102 placed at the inlet of the exhaust dilution duct 96 prevents the combustion exhaust E from flowing back to the exhaust dilution fan 100 to prevent the combustion exhaust E from being mixed with the air A1. If there is no backflow preventer 102 and a contrary wind occurs, the outlet of the exhaust dilution fan 100 is shut to cause the combustion exhaust E to flow back to the air supply outlet of the exhaust dilution fan 100. If the combustion exhaust E flows into the space of the housing 26, the combustion exhaust E is absorbed into the combustion fan 42, and combustion failure of the burner 36 is generated by the exhaust obstruction. This is exhaust recycling by a backflow of the combustion exhaust E.

If a backflow of the combustion exhaust E is generated, the occurrence of the above described exhaust recycling is prevented by closing the backflow preventer 102. In this case, if the backflow preventer 102 is closed, the temperature of the combustion exhaust E in the exhaust dilution unit 32 increases since the air A2 is not supplied to the exhaust dilution duct 96. This increase of the temperature is detected by the exhaust temperature sensor 108. The temperature detected by the exhaust temperature sensor 108 is informed to the electric board 110 rapidly. As a result, combustion control that the combustion of the burner 36 is immediately decreased is performed. Like the above, the occurrence of the combustion failure due to the backflow of the combustion exhaust E can be prevented and the temperature rising in the exhaust dilution unit 32 can be surely prevented by adjusting the combustion.

The backflow preventer 102 is an example of backflow preventing means. As depicted in FIG. 5A, the backflow preventer 102 is rotatably supported at the outlet of the exhaust dilution fan 100 by a hinge 101, and opens and closes the exhaust dilution duct 96 by the force of wind (wind pressure). If the exhaust dilution fan 100 is operated, the air supply A2 is generated. The backflow preventer 102 is opened in response to the air supply A2 and the air supply A2 flows into the exhaust dilution duct 96. If the exhaust dilution fan 100 stops, the backflow preventer 102 restores a closed position by its own weight as depicted in dashed lines.

If a contrary wind CW of higher wind pressure than the air supply A2 acts on the exhaust dilution duct 96, as depicted in FIG. 5B, the backflow preventer 102 is pushed back to its closed position by the contrary wind CW. As a result, it can be prevented for the contrary wind CW to run into the exhaust dilution fan 100.

The exhaust Hi limit 106 is, as depicted in FIG. 6A, a temperature detection switch including a temperature detection part 107 and opening and closing contact 109. The temperature detection part 107 may be made of a bimetal. The opening and closing contact 109 is a contact opened and closed by a bimetal. In the exhaust Hi limit 106, as depicted in FIG. 6B, switching operation of a hysteresis characteristic is obtained. If the temperature detection part 107 detects an upper temperature limit H=69 (° C.), the opening and closing contact 109 is switched from a closed state (conducting) to an opened state (non-conducting). After the upper temperature limit H=69 (° C.) is detected, the opening and closing contact 109 is kept opened till the temperature detection part 107 detects a lower temperature limit L=55 (° C.). After the temperature reaches the lower temperature limit L=55 (° C.), the opening and closing contact 109 is switched to closed.

Figure 7A:
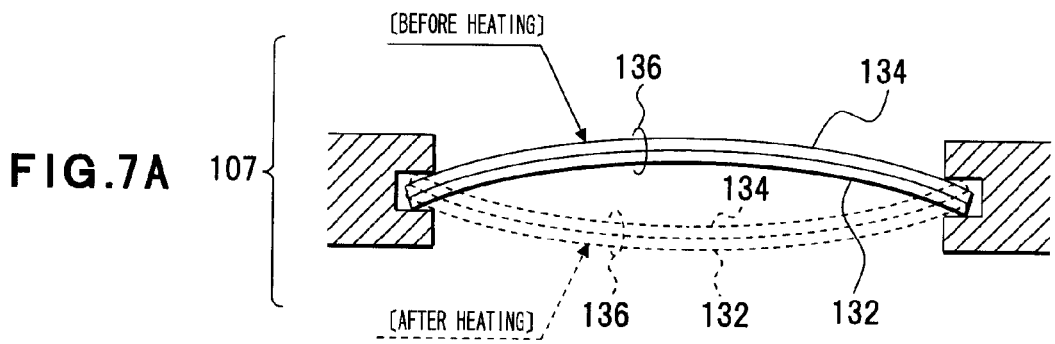
FIGS. 7A to 7C depict an example of structure of the exhaust Hi limit and operation thereof.

The exhaust Hi limit 106 will be described with reference to FIGS. 7A to 7C. FIG. 7A depicts the principle of the temperature detection part of the exhaust Hi limit, and FIGS. 7B and 7C depict switching structure of the exhaust Hi limit and the operation thereof.

A bimetal 136 is used for the temperature detection part 107 as depicted in FIG. 7A that is made by uniting a high expansion coefficient metal 132 presenting high expansion by heating and a low expansion coefficient metal 134 of lower expansion than the high expansion coefficient metal 132. The bimetal 136 is supported so as to be able to change the position of its ends. The position thereof is changed from that depicted by solid lines before heating to that depicted by broken lines after heating.

The exhaust Hi limit 106 is a sensing temperature switch providing the bimetal 136 at the temperature detection part 107. A pin 138 touching its end to the bimetal 136 is movably held by a retainer 140 in the exhaust Hi limit 106 as depicted in FIG. 7B. A spring 144 is inserted between another end of the pin 138 and a case 142. Restoring force of the spring 144 acts. A fixing contact 146 is attached to a fixing piece 145 fixed to the case 142. A movable contact 148 is attached to the spring 144.

Figure 7B:
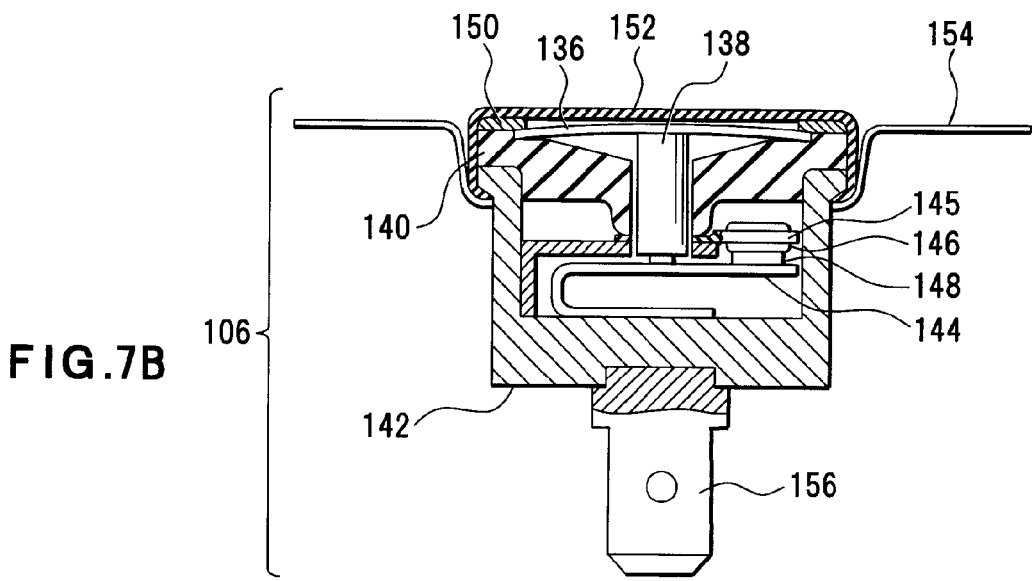
Figure 7C:
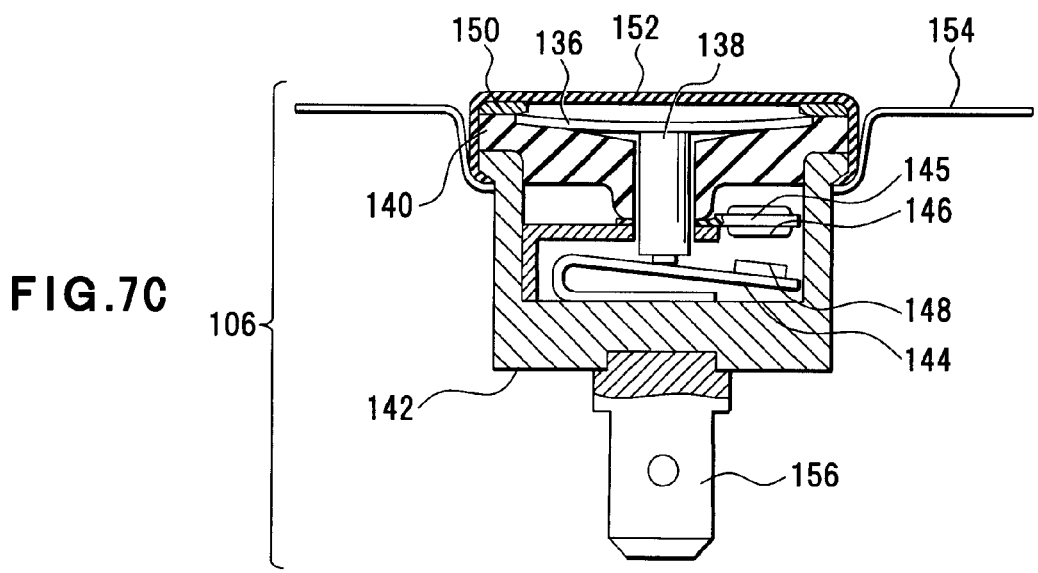

Before heating, as depicted in FIG. 7B, the movable contact 148 touches the fixing contact 146 to maintain a closed state (a state of the opening and closing contact 109 depicted by solid lines in FIG. 6A). After heating, as depicted in FIG. 7C, the movable contact 148 separates from the fixing contact 146 since the pin 138 receiving the change of the bimetal 136 drops down to compress the spring 144 (a state of the opening and closing contact 109 depicted by broken lines in FIG. 6A). Like the above, a temperature is detected and opening and closing of the fixing contact 146 and the movable contact 148 is realized.

A cap 152 is attached to the top of the case 142 intervening a spacer 150 between the cap 152 and the retainer 140. The case 142 is provided with an attachment 154. A terminal 156 is placed at the bottom of the case 142. The terminal 156 is connected to the movable contact 148 in the spring 144, and a different terminal is provided for the fixing contact 146 in the fixing piece 145. Therefore, the case 142 is fixed to an outer wall of the dilution exhaust unit 32 by the attachment 154, and an output by the opening and closing of the fixing contact 146 and the movable contact 148 based on temperature detection can be obtained.

Figure 8:
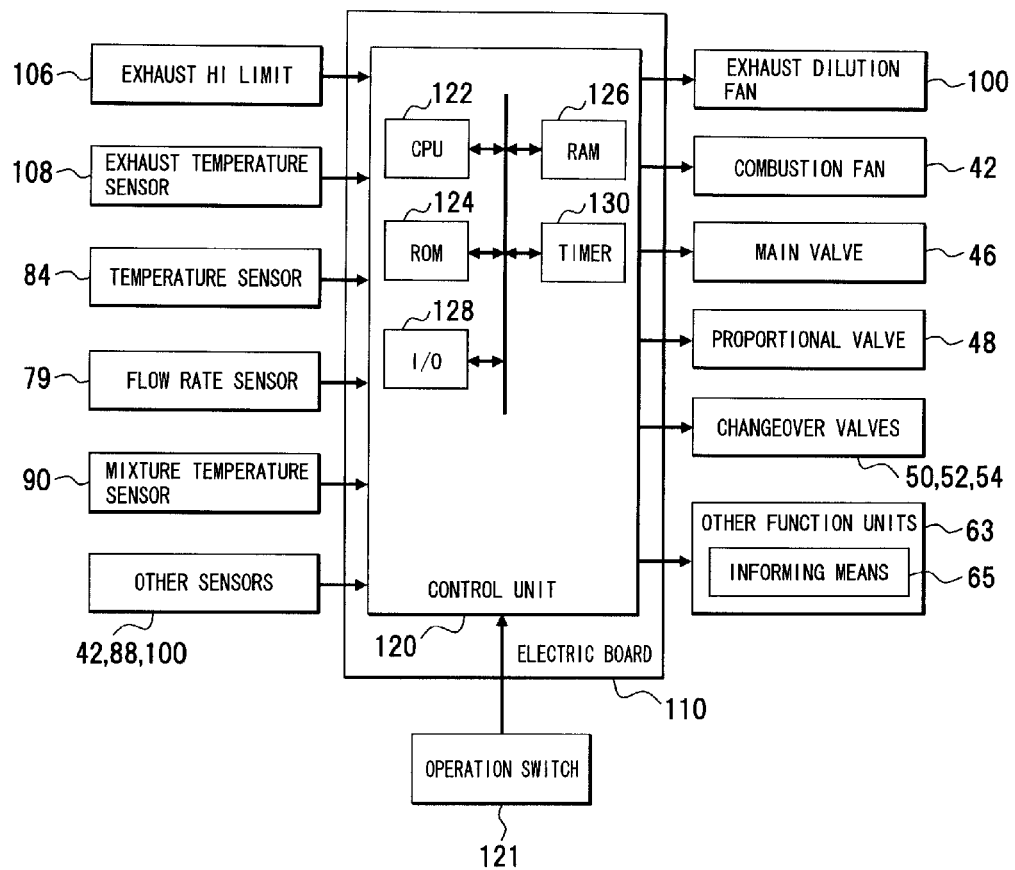
FIG. 8 depicts an example of an electric board.

A control system of the water heater 6 will be described with reference to FIG. 8. FIG. 8 depicts an example of the structure of an electric board. In FIG. 8, the same components as those in FIGS. 2 to 4 are denoted by the same reference numerals.

The electronic board 110 is an example of a combustion control board or a combustion control system of the present invention, and provides a control unit 120. The control unit 120 is an example of control means, may be composed of a microcomputer, and, for example, provides a CPU (Central Processing Unit) 122, a ROM (Read-Only Memory) 124, a RAM (Random-Access Memory) 126, an input/output unit (I/O) 128 and a timer 130.

The CPU 122 is an example of calculation means executing various calculation, determining means for detection information and control means for generating a control output etc. The CPU 122 executes a control program in the ROM 124 and generates a control output based on combustion control on the basis of a flame determination result, detected temperatures, detected flow rates, etc. The ROM 124 is an example of storage means storing a control program etc. The RAM 126 composes an execution area of a program. The I/O 128 is an example of an input unit taking detection information etc. and an output unit outputting a control output to various function units. The timer 130 is an example of time keeping means and measures combustion time etc.

Start and stop information on driving is inputted from a driving switch 121 to the control unit 120 of the electric board 110. As detection information, flow rate information is inputted from the flow rate sensor 79 to the control unit 120 and temperature information etc. are inputted from the temperature sensor 84, the hot water temperature sensor 88, the mixture temperature sensor 90 and the exhaust Hi limit 106 to the control unit 120. Rotating speed information etc. is inputted from the combustion fan 42 and the exhaust dilution fan 100 of the air supply unit is also inputted to the control unit 120. Information whether there is FR current or not and information on current measured value as flame detection information from a flame rod are also inputted to the electric board 110.

Control information based on the input information is outputted to the combustion fan 42, the exhaust dilution fan 100, the main valve 46, the proportional valve 48, the changeover valves 50, 52 and 54, the water control valve 82, the igniter 62 and other function units 63. The other function units 63 may include informing means 65 such as a speaker, a buzzer and a display.

An example of exhaust temperature control using the electric board 110 will be described. This temperature control of the combustion exhaust E is realized by controlling the volume of combustion or flow rate of outgoing hot water according to the temperature detected by the exhaust temperature sensor 108 while the combustion is maintained. Since the amount of the combustion (the fuel supply rate) and the flow rate of outgoing hot water are linked, the fuel supply rate may be adjusted or the flow rate of outgoing hot water may be adjusted.

(1) Control of Combustion

When the temperature of the combustion exhaust E is equal to or over the upper temperature limit H, the maximum combustion capacity (unit used in Japan: "gou") is gradually reduced. When the temperature of the combustion exhaust E is lowered to the lower temperature limit L, the maximum combustion capacity ("gou") is gradually increased. Thereby, the temperature of the combustion exhaust E is controlled to be within predetermined temperatures. In this case, the temperature of outgoing hot water is kept in setting temperatures. The range of "gou" (1 to 5 (gou)) may be changed according to the temperature of the combustion exhaust E as another way.

(2) Flow Rate Control of Outgoing Hot Water

When the temperature of the combustion exhaust E is equal to or over the upper temperature limit H, the flow rate of outgoing hot water is reduced by narrowing the opening of the water control valve 82. When the temperature of the combustion exhaust E reaches the lower temperature limit L, the flow rate of outgoing hot water is increased by the degree of the opening of the water control valve 82. Thereby, as well, the temperature of the combustion exhaust E is controlled to be within predetermined temperatures. In this case, the temperature of outgoing hot water is also kept in setting temperatures.

In this case, since the flow rates of outgoing hot water and those of supplied water are the same, "gou" can be adjusted by regulating or adjusting the opening of the water control valve 82.

(3) As to "Gou"

The above described "gou" (Japanese) represents the water heating capacity of the water heater 6. As to "gou", 1 (gou) is the capacity that the temperature of 1 (L) of water W is raised by 25 (° C.) a minute. The capacity an hour is $$1(gou) = 1 \text{ (L/min)} \times 1 \text{ (kcal/L} \cdot \text{° C.)} \times 25(\text{° C.}) \times 60 \text{ (min/h)} \quad (1)$$
$$= 1,500 \text{ (kcal/h)}$$

That is, the formula (1) represents that the combustion and the flow rate are increased and decreased in proportion to "gou".

(4) Conversion of "Gou" to US Formula

Since 1 (kcal/h)=3.968 (BTU/h), 1,500 (kcal/h)=5,952 (BTU/h)=1 (gou).

(5) Relationship among Exhaust Temperature, "Gou", Supplied Water Temperature, Outgoing Hot Water Temperature and Flow Rate With reference to the formula (1), "gou" is determined by the deference between a supplied water temperature and an outgoing hot water temperature, and the flow rate. Assuming that a supplied water temperature and outgoing hot water temperature are constant, the temperature of the combustion exhaust E depends on "gou". Therefore, it is found that in order to lower the temperature of the combustion exhaust E, "gou" may be decreased.

The above described water heater 6 controls the combustion of the burner 36 so that an outgoing hot water temperature becomes setting temperatures. If the flow rate changes, the combustion of the burner 36 is controlled according to the change to control the hot water supply temperature within setting temperatures. If the maximum regulated flow rate is gradually reduced by the opening of the water control valve 82, "gou" decreases along therewith. That is, the decrease of "gou" is narrowing the opening of the proportional valve 48, and thereby, the maximum combustion capacity is regulated. In the other words, if the opening of the proportional valve 48 is gradually narrowed, the opening of the water control valve 82 is gradually narrowed along therewith, the flow rate of supplied hot water is reduced, and the temperature of outgoing hot water is kept constant.

In such control, to keep an outgoing hot water temperature constant is a priority. However, an outgoing hot water temperature may be changed by adjusting setting temperatures. If an outgoing hot water temperature is changed to keep the flow rate constant, the above described "gou" results in changing.

Figure 9:
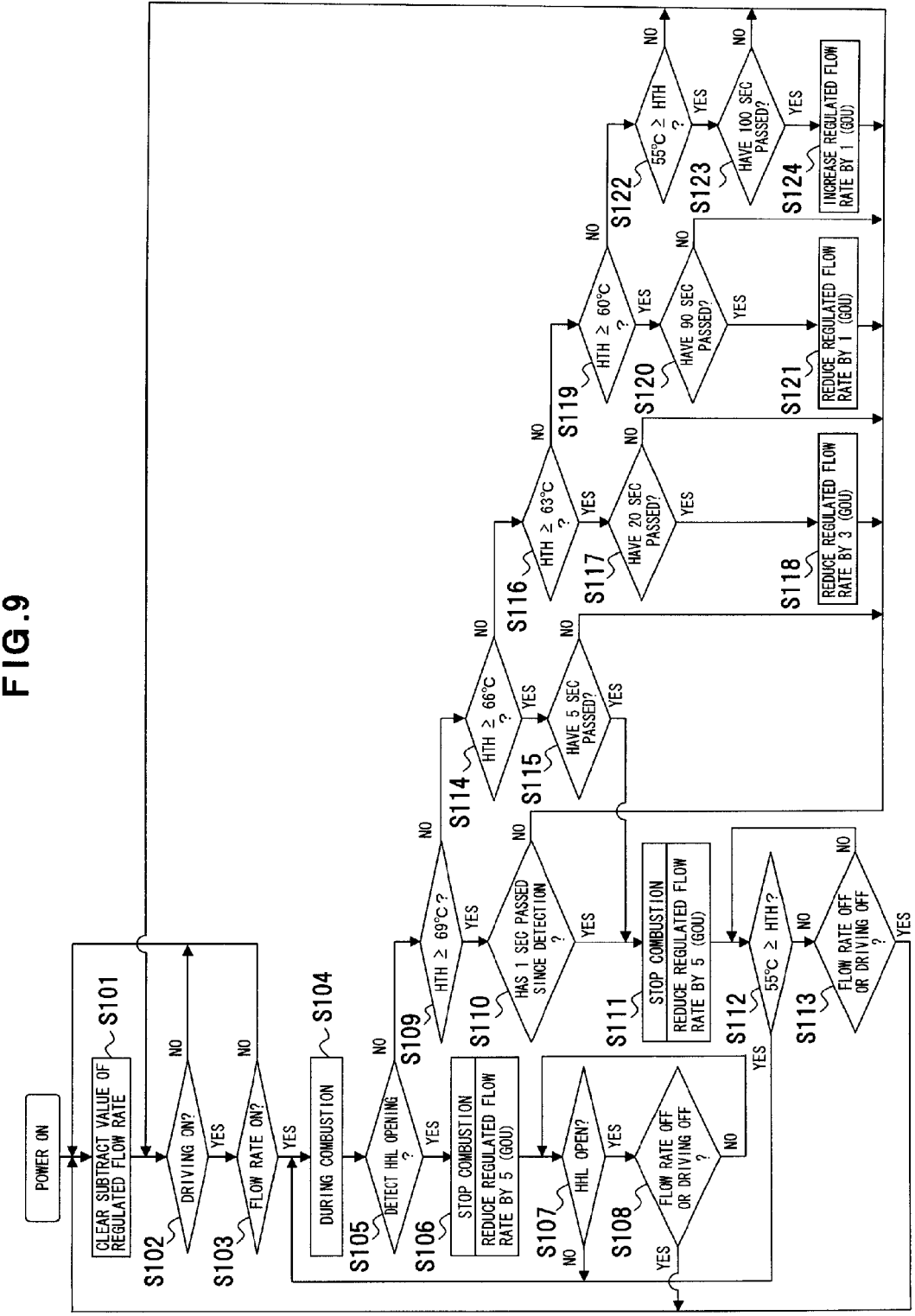
FIG. 9 is a flowchart depicting an example of processing procedure of exhaust temperature control.

This exhaust temperature control will be described with reference to FIG. 9. FIG. 9 depicts an example of processing procedure of exhaust temperature control.

This processing procedure is an example of a method for the combustion control or a combustion control program of the present invention. The processing procedure includes the above described temperature control of the combustion exhaust E. In the processing procedure, the upper temperature limit 69 (° C.) and the lower temperature limit 55 (° C.) are set in order to realize the control according to the temperature detected by the exhaust temperature sensor 108. Between these upper temperature limit (set in 69 (° C.) as a first temperature in the procedure) and the lower temperature limit (set in 55 (° C.) as a fifth temperature in the procedure), a second temperature 66 (° C.), a third temperature 63 (° C.) and a fourth temperature 60 (° C.) are set.

As depicted in FIG. 9, the processing procedure starts from the power turned ON. Clearing subtract values for the regulated flow rate is executed as an initial reset (step S101). In this clearing of subtract values for the regulated flow rate, a reset of data representing "gou" regulation before the driving switch 121 turned ON (the maximum regulated flow rate and the maximum combustion capacity regulation value) is executed, and the maximum "gou" of an initial setting is set again.

After the power ON, the operation of the driving switch 121 is monitored (step S102). If the driving switch 121 is not turned ON (NO of step S102), the procedure returns to step S101 to be standby.

If the driving switch 121 is turned ON (YES of step S102), the flow rate of supplied water is monitored (step S103). If the flow rate detected by the flow rate sensor 79 is below a predetermined flow rate (NO of step S103), the procedure becomes standby.

If the flow rate detected by the flow rate sensor 79 is equal to or over the predetermined flow rate (ON) (YES of step S103), the combustion fan 42 and the exhaust dilution fan 100 are operated since a demand for hot water is generated by the opening of the hot water supply faucet 95. The combustion of the fuel gas G is started by the burner 36 and the combustion is maintained (step S104).

During the combustion of the fuel gas G, the temperature of the combustion exhaust E is detected by the exhaust temperature sensor 108 and the switching operation of the exhaust Hi limit (HHL) 106 is monitored (step S105). The temperature detected by the exhaust temperature sensor 108 and closing information or opening information of the exhaust Hi limit 106 are taken into the control unit 120.

[Control by Opening or Closing of Exhaust Hi Limit 106]

When the exhaust Hi limit 106 is opened (YES of step S105), the combustion of the burner 36 is stopped and "gou" is decreased, for example, by 5 (gou) to reduce the regulated flow rate (step S106). The opening or closing of the exhaust Hi limit 106 is continuously monitored, (step S107). If the exhaust Hi limit 106 is closed (NO of step S107), the procedure returns to step S104.

If the exhaust Hi limit 106 is opened (YES of step S107), whether to be the flow rate OFF or driving OFF, or not is determined (step S108) since the exhaust temperature is over the upper temperature limit H=69 (° C.). The flow rate OFF is the flow rate possible to be regarded as OFF by reducing the flow rate of supplied water. The driving OFF is a state where the driving switch 121 is switched OFF.

If the flow rate or driving is OFF (YES of step S108), the procedure returns to step S101. If the flow rate or driving is not OFF (NO of step S108), the procedure returns to step S107.

In the above processes of steps S105 to S108, if the exhaust dilution unit 32 is cooled down and the exhaust Hi limit 106 is closed after the combustion is stopped, the combustion is restarted. However, though the combustion is restarted, the combustion is stopped again if the temperature of the combustion exhaust E is higher. Thus, subtraction of the regulated flow rate is executed that the combustion is reduced by 5 (gou) from "gou" when the combustion is stopped to make the exhaust temperature equate to or lower below the predetermined temperature. In this case, driving can be restarted by once closing and then reopening the hot water supply faucet 95, or by once turning the driving switch 121 OFF and then ON again. At that time, the subtract value of the regulated flow rate is cleared. If such processes are repeated, the control unit 120 determines that there is some anomaly, and an alarm may be given from the informing means 65.

[Control by Temperature Detected by Exhaust Temperature Sensor 108]

If the exhaust Hi limit 106 is closed (NO of step S105), the temperature detected by the exhaust temperature sensor 108 (HTH) is monitored and control according to the detected temperature is executed (steps S109 to S124).

If the temperature detected by the exhaust temperature sensor 108 is equal to or over the upper temperature limit H=69 (° C.) (YES of step S109), monitoring for a predetermined time since the detection is executed (step S110). If the predetermined time, for example, 1 (sec) has passed since the detection of the temperature equal to or over the upper temperature limit H=69 (° C.) (YES of step S110), stopping the combustion, reducing "gou" by 5 (gou) and reducing the regulated flow rate are executed (step S111), and it is determined whether the temperature of the combustion exhaust E is equal to or below the lower temperature limit L or not (step S112). If 1 (sec) has not passed (NO of step S110), the procedure returns to step S102.

If the temperature is equal to or below the lower temperature limit L=55 (° C.) (YES of step S112), the procedure returns to step S104. If the temperature is over the lower temperature limit L=55 (° C.) (NO of step S112), whether to be the flow rate or driving OFF, or not is determined (step S113). If the flow rate or driving is OFF (YES of step S113), the procedure returns to step S101. If the flow rate or driving is not OFF (NO of step S113), the procedure returns to step S112.

If the temperature detected by the exhaust temperature sensor 108 is below the upper temperature limit H=69 (° C.) (NO of step S109), it is determined whether or not the detected temperature is equal to or over the second temperature, for example, 66 (° C.) (step S114). Whether or not a predetermined time, for example, 5 (sec) have passed since the detection of the second temperature is determined (step S115). If 5 (sec) have passed (YES of step S115), the procedure moves to step S111. If 5 (sec) of the predetermined time have not passed (NO of step S115), the procedure returns to step S102.

Like the above, in the processes of steps S109 to S115, detection time and the subtract value of the regulated flow rate vary according to the detected temperature of the combustion exhaust E. For example, if the detected temperature of the combustion exhaust E is equal to or over 69 (° C.), whether detection time, for example, 1 (sec) has passed or not is determined. If at least 1 (sec) or over has passed in a state that the temperature is equal to or over 69 (° C.), the combustion is stopped (step S111). When the combustion is stopped, subtraction of the regulated flow rate is executed and the exhaust temperature is controlled. After that, if the exhaust temperature sensor 108 detects the temperature 55 (° C.) or below, the combustion is restarted. If the temperature detected by the exhaust temperature sensor 108 is not 55 (° C.) or below, the subtract value of the regulated flow rate is cleared (step S101) by once closing, and then reopening the hot water supply faucet 95 to enable the combustion to be restarted.

If the detected temperature of the combustion exhaust E is below 69 (° C.), whether to be equal to or over 66 (° C.), or not is determined. If the exhaust temperature is equal to or over 66 (° C.), whether detection time, for example 5 (sec) have passed or not is determined. If the exhaust temperature=66 (° C.) has been maintained for 5 (sec), the combustion is stopped. When the combustion is stopped, subtraction of the regulated flow rate is executed and the exhaust temperature is limited. After that, if the exhaust temperature sensor 108 detects 55 (° C.) or below, the combustion is restarted. If the hot water supply faucet 95 is closed and then, reopened before the temperature detected by the exhaust temperature sensor 108 is equal to or below 55 (° C.), the subtract value of the regulated flow rate is cleared (step S101) to enable the combustion to be restarted.

If the temperature detected by the exhaust temperature sensor 108 is below the second temperature=66 (° C.) (NO of step S114), it is determined whether the detected temperature is equal to or over the third temperature, for example, 63 (° C.), or not (step S116). It is determined whether or not a predetermined time, for example, 20 (sec) have passed since the detection of the third temperature (step S117). If 20 (sec) have passed (YES of step S117), reducing "gou" by 3 (gou) and reducing the regulated flow rate are executed (step S118), and the procedure returns to step S102.

Like the above, in steps S116 to S118, if the exhaust temperature is below 66 (° C.), whether to be equal to or over a predetermined temperature, for example, 63 (° C.), or not is determined. If the exhaust temperature is equal to or over 63 (° C.), it is determined whether detection time, for example, 20 (sec) have passed or not. If the exhaust temperature 63 (° C.) or over have been maintained for 20 (sec), subtraction of the regulated flow rate (3 "gou") is executed and the exhaust temperature is limited. Differentiating and setting monitoring time longer than step S115 are because accurate temperature information is needed to be taken in since there requires a predetermined time till the flow rate regulation due to continuous temperature detection and since the result of the regulation is not reflected in the exhaust temperature unless a predetermined time has passed from the flow rate regulation.

If the temperature detected by the exhaust temperature sensor 108 is below the third temperature=63 (° C.) (NO of step S116), it is determined whether the detected temperature is equal to or over the fourth temperature, for example, 60 (° C.), or not (step S119). It is determined whether or not a predetermined time, for example, 90 (sec) have passed since the detection of the fourth temperature (step S120). If 90 (sec) have passed (YES of step S120), reducing "gou" by 1 (gou) and reducing the regulated flow rate are executed (step S121), and the procedure returns to step S102.

Like the above, in the processes of steps S119 to S121, if the exhaust temperature is below 63 (° C.), whether to be equal to or over a predetermined temperature, for example, 60 (° C.), or not is determined. If the exhaust temperature is equal to or over 60 (° C.), it is determined whether detection time, for example, 90 (sec) have passed or not. If the exhaust temperature 60 (° C.) or over has been maintained for 90 (sec), subtraction of the regulated flow rate (1 "gou") is executed and the exhaust temperature is limited. Setting monitoring time longer than step S117 as well is because accurate temperature information is needed to be taken in since there requires a predetermined time till the flow rate regulation due to continuous temperature detection and since the result of the regulation is reflected in the exhaust temperature unless a predetermined time has passed from the flow rate regulation.

If the temperature detected by the exhaust temperature sensor 108 is below the fourth temperature=60 (° C.) (NO of step S119), it is determined whether the detected temperature is equal to or below the lower temperature limit L=55 (° C.), or not (step S122). If the detected temperature is equal to or below the lower temperature limit L=55 (° C.) (YES of step S122), it is determined whether a predetermined time, for example, 100 (sec) have passed since the detection of the lower temperature limit L=55 (° C.) (step S123). If 100 (sec) have passed (YES of step S123), increasing "gou" by 1 (gou) and increasing the regulated flow rate are executed (step S124) and the procedure returns to step S102. If the detected temperature is equal to or over the lower temperature limit L=55 (° C.) (NO of step S122), the procedure returns to step S102 unless 100 (sec) have not passed since the detection of the lower temperature limit L=55 (° C.) (NO of step S123).

Like the above, in the processes of steps S122 to S124, if the exhaust temperature is below 60 (° C.), whether to be equal to or below a predetermined temperature, for example, 55 (° C.), or not is determined. If the exhaust temperature is equal to or below 55 (° C.), it is determined whether detection time, for example, 100 (sec) have passed or not. If the exhaust temperature 55 (° C.) or below has been maintained for 100 (sec), the regulated flow rate is increased by 1 "gou" to release the regulation of the exhaust temperature. Although the regulated flow rate is increased, the procedure returns to step S102 again to confirm the change of the temperature of the combustion exhaust E after the control to detect the temperature. Increasing the regulated flow rate increases the hot water outgoing capacity again. For example, when the regulated flow rate increases more than need or when outgoing hot water is reduced or a setting temperature is lowered during use, the hot water outgoing capacity can be increased.

As to the regulated flow rate, in the water heater 6 of the maximum combustion capacity, for example, 31 (gou) (=Iput: 199,000 (BTU/h)), "gou" for the regulated flow rate=the maximum "gou" of the water heater 6 in the start of driving. Being raised by 25 (° C.) needs the regulated flow rate 31 (L/min). If 5 (gou) is subtracted from "gou" of the regulated flow rate, "gou" becomes 26 (gou), and the regulated flow rate being raised by 25 (° C.) is 26 (L/min). If the regulated flow rate is set in 31 (L/min), the opening of the water control valve 82 is narrowed and the regulated flow rate is reduced by 5 (gou) if the temperature of the combustion exhaust E exceeds 69 (° C.). If the regulated flow rate is reduced from 31 (L) to 26 (L), the proportional valve 48 is narrowed maintaining the outgoing hot water temperature, and the combustion capacity is suppressed, the temperature of the combustion exhaust E can be moved to be equal to or below 69 (° C.). In this case, the opening of the proportional valve 48 may be narrowed to reduce the maximum combustion capacity of the burner 36 directly. If the outgoing hot water temperature is tried to be maintained, the flow rate of supplied hot water results in decreasing.

Like the above, the temperature of the combustion exhaust E is controlled between the upper temperature limit H=69 (° C.) and the lower temperature limit L=55 (° C.) by the control of the regulated flow rate. In the other words, the temperature of the combustion exhaust E can be regulated equal to or below 69 (° C.). Moreover, this control of the exhaust temperature is realized by the combustion control maintaining the combustion of a burner.

Since the temperature of the combustion exhaust E flowing from the exhaust dilution unit 32 to the exhaust tube 34 can be regulated equal to or below 69 (° C.), a material of low heat-resistance can be used for an exhaust system such as the exhaust path 10. Therefore, a part or all of the exhaust system such as the exhaust path 10 can be composed of a material of low heat-resistance, for example, synthetic resin.

Following effects can be obtained from the embodiment.

(1) The air supply A2 is mixed with the combustion exhaust E, whose temperature is lowered by secondary heat exchange, using the exhaust dilution fan 100, and the temperature of the combustion exhaust E flowing into the exhaust tube 34 is lowered so that a material of low heat-resistance such as a resin duct can stand heat.

(2) The temperature of the combustion exhaust E is continuously monitored by installing the exhaust temperature sensor 108, and the combustion control in response to the exhaust temperature is realized to improve the safety.

(3) If the temperature of the combustion exhaust E is equal to or over the upper temperature limit H, the combustion can be stopped by the installation of the exhaust Hi limit 106 to provide the water heater 6 of high safety.

(4) The air supply A2 is mixed with the combustion exhaust E after heat exchange, and the air supply A2 is prevented from flowing into the secondary heat exchanger 40 at the downstream side. Thus, the exhaust temperature of the combustion exhaust E can be efficiently lowered without reducing the heat exchange efficiency of the secondary heat exchanger 40.

(5) If the contrary wind CW acts on the backflow preventer 102 to obstruct the water heater 6, the exhaust dilution fan 100 is stopped and the combustion continuation is canceled. Thus, the water heater 6 of high safety can be realized.

Third Embodiment

In the second embodiment, the control of the exhaust temperature is disclosed that the combustion is reduced to lower the temperature of the combustion exhaust E. This third embodiment discloses that the temperature of the combustion exhaust E is lowered by dilution air from the exhaust dilution fan 100.

Figure 10:
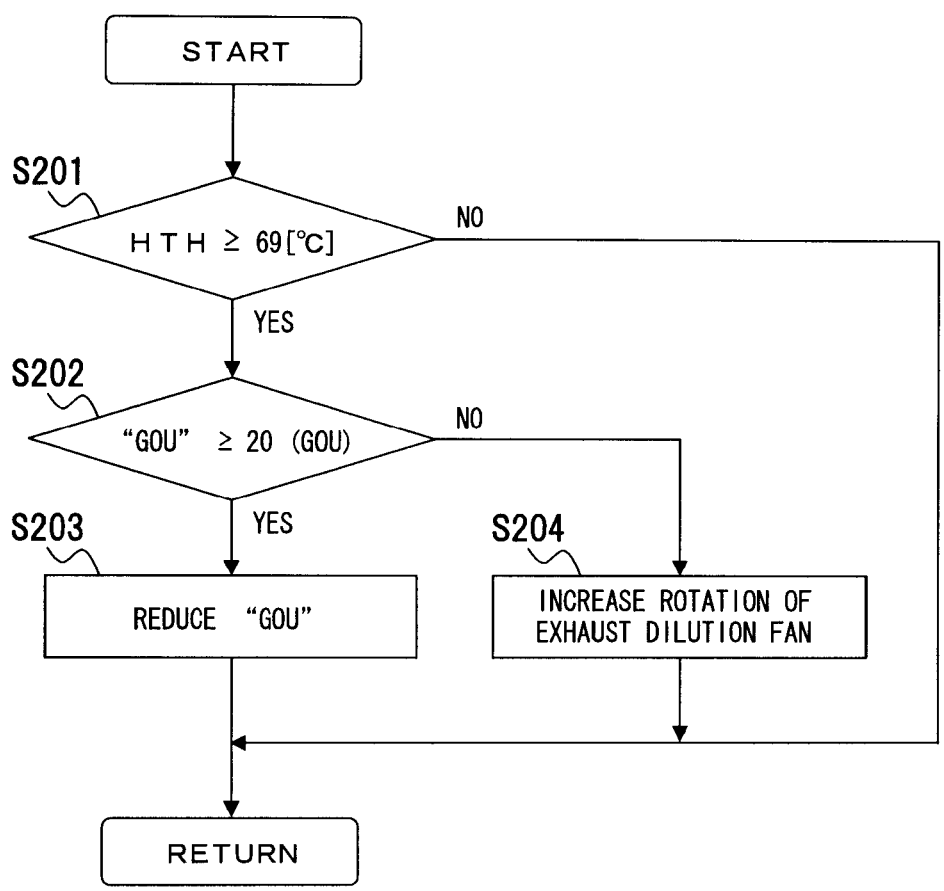
FIG. 10 is a flowchart depicting an example of processing procedure of exhaust temperature control according to a third embodiment.

The third embodiment will be described with reference to FIG. 10. FIG. 10 depicts an example of processing procedure of an exhaust temperature control process according to the third embodiment.

The processing procedure is an example of the present invention, and includes a process that the rotation speed of the exhaust dilution fan 100 is increased maintaining the volume of the combustion, and dilution air is increased to lower the exhaust temperature. The processing procedure is executed in the above described water heater 6. In the processing procedure, as depicted in FIG. 10, it is determined whether the detected temperature of the combustion exhaust E is equal to or over 69 (° C.). If the temperature is below 69 (° C.), this process is not executed.

If the detected temperature of the combustion exhaust E is equal to or over 69 (° C.) (step S201), whether "gou" is equal to or over 20 (gou), or not is determined (step S202). If "gou" is equal to or over 20 (gou) (YES of step S202), reduction of "gou" is executed (step S203) as well as the second embodiment, and the procedure returns to the process like the second embodiment.

If "gou" is below 20 (gou) (NO of step S202), the rotation speed of the exhaust dilution fan 100 is increased (step S204), and the procedure returns to the process like the second embodiment.

If the combustion is reduced, the temperature of the combustion exhaust E can be lowered. However, in this case, it is predictable that the flow rate desired by a user cannot be obtained. In order to lower the exhaust temperature maintaining the flow rate, the rotation speed of the exhaust dilution fan 100 may be increased. By increasing the rotation speed of the exhaust dilution fan 100 and increasing the air supply A2 to be mixed with the combustion exhaust E, the temperature of the combustion exhaust E can be lowered with the air supply A2.

If "gou" is high, for example, over 20 (gou), the combustion exhaust E (the volume of exhaust) results in increasing. The volume of the combustion exhaust E is high so that it is predictable that the temperature of the combustion exhaust E cannot be lowered below the upper temperature limit H=69 (° C.) even if the rotation speed of the exhaust dilution fan 100 is increased. Thus, a reference value is set for "gou". In this embodiment, 20 (gou) is set for a threshold level, and "gou" is over 20 (gou), reduction of "gou" is executed. If "gou" is below 20 (gou), the volume of dilution air is increased.

According to such structure, the exhaust temperature of the combustion exhaust E can be lowered by increasing the rotation speed of the exhaust dilution fan 100.

If "gou" exceeds a predetermined value, reduction of "gou" is executed, and the control of the exhaust dilution fan 100 is not executed only when "gou" is below predetermined "gou". Thereby, there is no need to widen capability of the exhaust dilution fan 100, and the compact water heater 6 is achieved.

Therefore, according to the control of the above processing procedure, the flow rate may be decreased when the used hot water supply capability is high, and the rotation speed of the exhaust dilution fan 100 may be increased when the capability is low. Thus, the control according to the hot water supply capacity of the water heater 6 can be realized, and the convenience can be improved.

Other Embodiments (1) As to exhaust temperature control, if the exhaust temperature rises by afterheating etc. while the combustion is stopped, the combustion fan 42 and the exhaust dilution fan 100 may be rotated in the minimum rotation speed when the exhaust temperature is high while the combustion is stopped or during the detection of the exhaust Hi limit 106.

By the detected temperatures of the hot water temperature sensor 88 at the outlet of the heat exchanger 38, the temperature detected by the exhaust temperature sensor 108 and a switching output of the exhaust Hi limit 106, the operation of the combustion fan 42 and the exhaust dilution fan 100 may be determined as depicted in FIGS. 11 and 12. According to the control using the detected temperatures of the hot water temperature sensor 88 at the outlet of the heat exchanger 38, the temperature detected by the exhaust temperature sensor 108 and a switching output of the exhaust Hi limit 106 like the above, freezing can be prevented.

(2) The backflow preventer 102 has the structure that opening and closing positions are automatically determined according to wind pressure in the above embodiments. The contrary wind CW acting on the backflow preventer 102 may be detected, and the opening and closing of the backflow preventer 102 may be controlled electrically by detected wind pressure and the wind pressure from the air supply A2.

Figure 13:
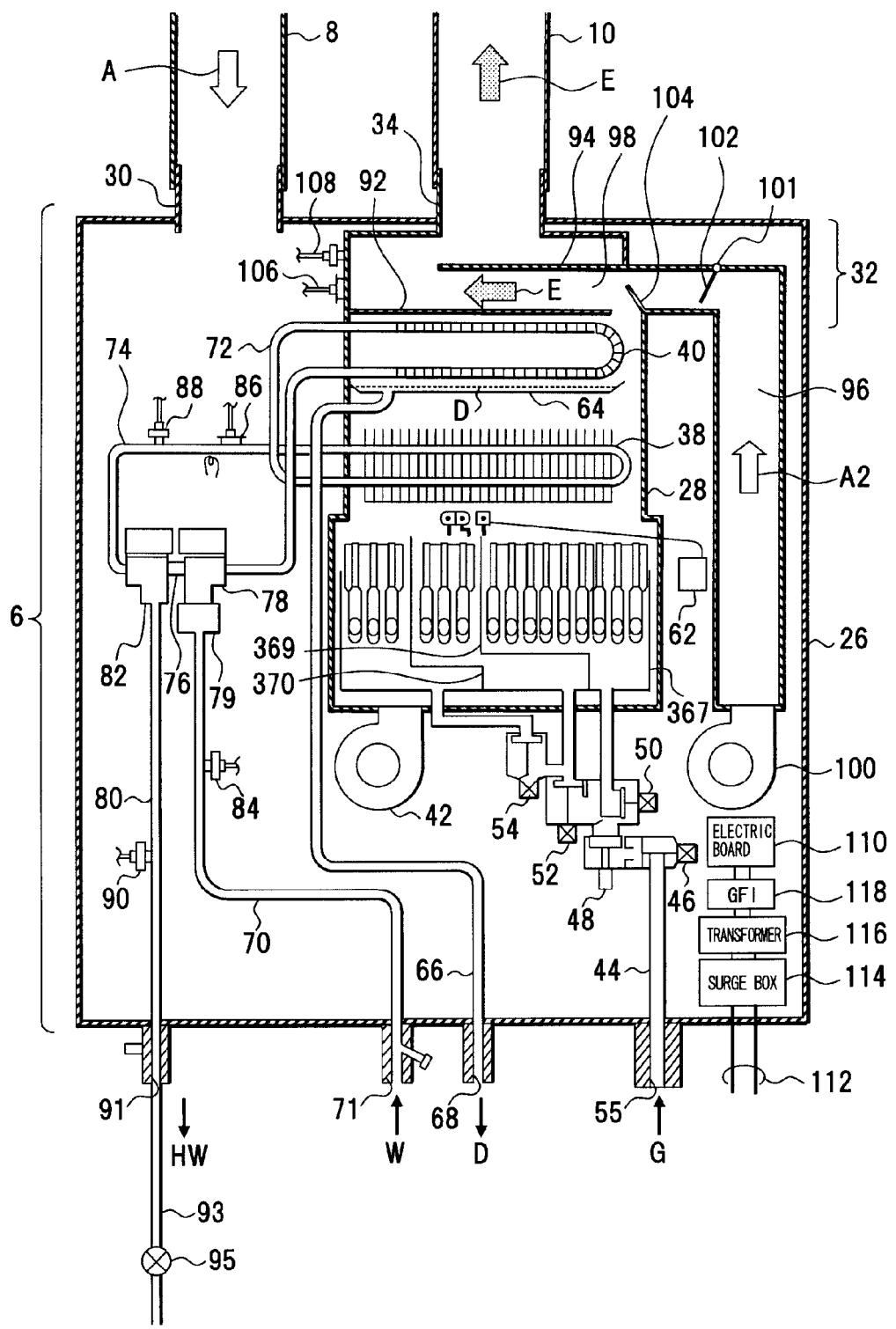
FIG. 13 depicts an example of a water heater according to the other embodiments.

(3) While the exhaust dilution duct 96 is set short and the exhaust dilution fan 100 is placed in the vicinity of the exhaust dilution unit 32 in the above embodiments, the inventions are not limited thereto. As depicted in FIG. 13, the exhaust dilution duct 96 may be arranged in parallel to the combustion chamber 28, and the height of the exhaust dilution fan 100 may be brought to the same as the combustion fan 42.

(4) The fuel gas G is exemplified as fuel in the above embodiments. Fuel is not limited to gas, and may be liquid.

(5) The place for introducing (mixing) dilution air by the dilution fan is made to join the exhaust outlet of the combustion air at the downstream side of the heat exchangers, for diluting the combustion air. A backflow preventer may be built in so as to be used for extended exhaust pipe.

(6) An exhaust temperature sensor monitoring an exhaust temperature may be placed at the exhaust outlet, and dilution fan rotating control means or combustion control means may be provided.

(7) A dilution fan and a dilution path from the dilution fan to the exhaust outlet may be placed at a proper place in the housing, and the mixture part with the combustion exhaust may be provided so as not to prevent combustion exhaust.

(8) In the above embodiments, the exhaust Hi limit 106 is used for the detection of the exhaustion temperature. The inventions are not limited thereto. Operation characteristics of the exhaust Hi limit 106 may be realized by a plurality of the exhaust temperature sensors that when the temperature of the combustion exhaust E reaches the upper temperature limit, conduction is switched to non-conduction when the temperature of the combustion exhaust E drops to the lower temperature limit, non-conduction is switched to conduction.

While the most preferred embodiments of the combustion apparatus, the method for combustion control, the combustion control board, the combustion control system and the water heater have been described hereinabove, the present invention is not limited to the above description, and it is a matter of course that various variations and modifications can be made by those skilled in the art within the scope of the claims without departing from the spirit of the invention disclosed herein, and needless to say, such variations and modifications are also encompassed in the scope of the present invention.

What is claimed is:

1. A combustion apparatus comprising:
   an air supply path supplying an outside air into a housing,
   a combustion means taking a combustion air from the housing, the combustion means combusting a fuel to generate a combustion exhaust;
   a heat exchange means exchanging heat of the combustion exhaust;
   an exhaust dilution unit supplying a dilution air to the combustion exhaust that passed through the heat exchange means, the exhaust dilution unit mixing the dilution air with the combustion exhaust to dilute the combustion exhaust by the dilution air; and
   an exhaust path venting the combustion exhaust diluted by the exhaust dilution unit from the housing,
   wherein the exhaust dilution unit includes:
   a duct allowing the dilution air to flow from the housing into the combustion exhaust after a heat exchange by the heat exchange means; and
   an exhaust dilution fan making the dilution air flow from the housing into the duct,
   wherein the exhaust dilution fan starts rotating in accordance with a combustion start of the combustion means, and
   wherein the exhaust dilution fan changes a rotation speed in accordance with amount of the combustion at the combustion means.

2. The combustion apparatus of claim 1,
   wherein the housing has an air supply tube, and the outside air is supplied to the air supply tube via the air supply path,
   wherein the combustion apparatus further comprises a combustion chamber placed in the housing, the combustion means and the heat exchange means being disposed in the combustion chamber, and
   wherein the exhaust dilution unit is placed at a downstream side of the combustion exhaust in the combustion chamber.

3. The combustion apparatus of claim 1, wherein the exhaust dilution unit has a path for mixing the dilution air supplied from the exhaust dilution fan with the combustion exhaust after the heat exchange.

4. The combustion apparatus of claim 1, wherein the exhaust dilution unit has an exhaust tube venting the combustion exhaust diluted by the exhaust dilution unit to the exhaust path.

5. The combustion apparatus of claim 1, wherein the exhaust dilution unit has a backflow preventing means that prevents a backflow of the combustion exhaust.

6. The combustion apparatus of claim 1, wherein the exhaust dilution unit has an air flow guiding means that guides a flow of the combustion exhaust for the dilution air.

7. The combustion apparatus of claim 1, further comprising
   a temperature detection means detecting a temperature of the combustion exhaust; and
   a control means stopping the combustion by the combustion means if a detected temperature of the combustion exhaust reaches an upper temperature limit or over, and permitting the combustion if the detected temperature reaches a lower temperature limit or below.

8. The combustion apparatus of claim 7, wherein
   the control means sets a plurality of different temperatures between the upper and the lower temperature limits for the detected temperature, adjusts the combustion of the fuel in the combustion means after the detected temperature reaches a set different temperature and a predetermined time has passed since the detected temperature reaches the set different temperature, and controls the temperature of the combustion exhaust.

9. The combustion apparatus of claim 1, wherein the heat exchange means is placed at a downstream side of the combustion exhaust and includes a secondary heat exchanger mainly recovering latent heat from the combustion exhaust.

10. A combustion control method, comprising:
taking a combustion air and combusting a fuel to generate a combustion exhaust via a combustion means;
exchanging heat of the combustion exhaust via a heat exchange means;
supplying a dilution air to the combustion exhaust after a heat exchange and mixing the dilution air with the combustion exhaust to dilute the combustion exhaust by the dilution air via an exhaust dilution unit; and
venting the combustion exhaust diluted via an exhaust path,
wherein supply of the dilution air starts in accordance with a combustion start of the fuel via an exhaust dilution fan, and
wherein the supply of the dilution air changes in accordance with amount of the combustion of the fuel via the exhaust dilution fan.

11. A combustion control system comprising:
an air supply path supplying an outside air into a housing,
a combustion means taking a combustion air from the housing, the combustion means combusting a fuel to generate a combustion exhaust;
a heat exchange means exchanging heat of the combustion exhaust;
an exhaust dilution unit supplying a dilution air to the combustion exhaust that passed through the heat exchange means, the exhaust dilution unit mixing the dilution air with the combustion exhaust to dilute the combustion exhaust by the dilution air;
an exhaust path venting the combustion exhaust diluted by the exhaust dilution unit from the housing, and
a control means stopping the combustion by the combustion means if a temperature of the combustion exhaust reaches an upper temperature limit or over, and permitting the combustion if the temperature of the combustion exhaust reaches a lower temperature limit or below,
wherein the exhaust dilution unit includes:
    a duct allowing the dilution air to flow from the housing into the combustion exhaust after a heat exchange by the heat exchange means; and
    an exhaust dilution fan making the dilution air flow from the housing into the duct,
wherein the exhaust dilution fan starts rotating in accordance with a combustion start of the combustion means, and
wherein the exhaust dilution fan changes a rotation speed in accordance with amount of the combustion at the combustion means.

12. The combustion control system of claim 11, wherein
the control means sets a plurality of different temperatures between the upper and the lower temperature limits for the temperature of the combustion exhaust, adjusts the combustion of the fuel in the combustion means after the temperature of the combustion exhaust reaches a set different temperature and a predetermined time has passed since the temperature of the combustion exhaust reaches the set different temperature, and controls the temperature of the combustion exhaust.

13. A water heater comprising:
an air supply path supplying an outside air into a housing,
a combustion means taking a combustion air from the housing, the combustion means combusting a fuel to generate a combustion exhaust;
a heat exchange means exchanging heat of the combustion exhaust for water;
an exhaust dilution unit supplying a dilution air to the combustion exhaust that passed through the heat exchange means, the exhaust dilution unit mixing the dilution air with the combustion exhaust to dilute the combustion exhaust by the dilution air; and
an exhaust path venting the combustion exhaust diluted by the exhaust dilution unit from the housing,
wherein the exhaust dilution unit includes:
    a duct allowing the dilution air to flow from the housing into the combustion exhaust after a heat exchange by the heat exchange means; and
    an exhaust dilution fan making the dilution air flow from the housing into the duct,
wherein the exhaust dilution fan starts rotating in accordance with a combustion start of the combustion means, and
wherein the exhaust dilution fan changes a rotation speed in accordance with amount of the combustion at the combustion means.

14. The water heater of claim 13, further comprising
a temperature detection means detecting a temperature of the combustion exhaust; and
a control means stopping the combustion by the combustion means if a detected temperature of the combustion exhaust reaches an upper temperature limit or over, and permitting the combustion if the detected temperature reaches a lower temperature limit or below.

15. The water heater of claim 14, wherein
the control means sets a plurality of different temperatures between the upper and the lower temperature limits for the detected temperature, adjusts the combustion of the fuel in the combustion means or outgoing hot water after the detected temperature reaches a set different temperature and a predetermined time has passed since the detected temperature reaches the set different temperature, and controls the temperature of the combustion exhaust.

16. A combustion apparatus comprising:
an air supply path supplying an outside air into a housing,
a burner taking a combustion air from the housing, the combustion means combusting a fuel to generate a combustion exhaust;
a heat exchanger exchanging heat of the combustion exhaust;
an exhaust dilution unit supplying a dilution air to the combustion exhaust that passed through the heat exchanger, the exhaust dilution unit mixing the dilution air with the combustion exhaust to dilute the combustion exhaust by the dilution air; and
an exhaust path venting the combustion exhaust diluted by the exhaust dilution unit from the housing,
wherein the exhaust dilution unit includes:
    a duct allowing the dilution air to flow from the housing into the combustion exhaust after a heat exchange by the heat exchanger; and
    an exhaust dilution fan making the dilution air flow from the housing into the duct,
wherein the exhaust dilution fan starts rotating in accordance with a combustion start of the burner, and
wherein the exhaust dilution fan changes a rotation speed in accordance with amount of the combustion at the burner.

17. A combustion control system comprising:
an air supply path supplying an outside air into a housing,
a burner taking a combustion air from the housing, the combustion means combusting a fuel to generate a combustion exhaust;

a heat exchanger exchanging heat of the combustion exhaust;

an exhaust dilution unit supplying a dilution air to the combustion exhaust that passed through the heat exchanger, the exhaust dilution unit mixing the dilution air with the combustion exhaust to dilute the combustion exhaust by the dilution air;

an exhaust path venting the combustion exhaust diluted by the exhaust dilution unit from the housing; and a control unit stopping the combustion by the burner if a temperature of the combustion exhaust reaches an upper temperature limit or over, and permitting the combustion if the temperature of the combustion exhaust reaches a lower temperature limit or below, wherein the exhaust dilution unit includes:
 a duct allowing the dilution air to flow from the housing into the combustion exhaust after a heat exchange by the heat exchanger; and
 an exhaust dilution fan making the dilution air flow from the housing into the duct, wherein the exhaust dilution fan starts rotating in accordance with a combustion start of the burner, and wherein the exhaust dilution fan changes a rotation speed in accordance with amount of the combustion at the burner.

18. A water heater comprising:

an air supply path supplying an outside air into a housing, a burner taking a combustion air from the housing, the combustion means combusting a fuel to generate a combustion exhaust;

a heat exchanger exchanging heat of the combustion exhaust for water;

an exhaust dilution unit supplying a dilution air to the combustion exhaust that passed through the heat exchanger, the exhaust dilution unit mixing the dilution air with the combustion exhaust to dilute the combustion exhaust by the dilution air; and an exhaust path venting the combustion exhaust diluted by the exhaust dilution unit from the housing, wherein the exhaust dilution unit includes:
 a duct allowing the dilution air to flow from the housing into the combustion exhaust after a heat exchange by the heat exchanger; and
 an exhaust dilution fan making the dilution air flow from the housing into the duct, wherein the exhaust dilution fan starts rotating in accordance with a combustion start of the burner, and wherein the exhaust dilution fan changes a rotation speed in accordance with amount of the combustion at the burner.

* * * * *